United States Patent
Farrow et al.

(10) Patent No.: US 10,520,671 B2
(45) Date of Patent: Dec. 31, 2019

(54) FIBER WITH DEPRESSED CENTRAL INDEX FOR INCREASED BEAM PARAMETER PRODUCT

(71) Applicant: nLIGHT, Inc., Vancouver, WA (US)

(72) Inventors: Roger L. Farrow, Vancouver, WA (US); Chris A. Rivera, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/742,770

(22) PCT Filed: Jul. 8, 2016

(86) PCT No.: PCT/US2016/041526
§ 371 (c)(1),
(2) Date: Jan. 8, 2018

(87) PCT Pub. No.: WO2017/008022
PCT Pub. Date: Jan. 12, 2017

(65) Prior Publication Data
US 2018/0203185 A1    Jul. 19, 2018

Related U.S. Application Data

(60) Provisional application No. 62/190,047, filed on Jul. 8, 2015.

(51) Int. Cl.
*G02B 6/036* (2006.01)
*H01S 3/067* (2006.01)
*H01S 3/00* (2006.01)

(52) U.S. Cl.
CPC ......... *G02B 6/03611* (2013.01); *H01S 3/005* (2013.01); *H01S 3/06729* (2013.01)

(58) Field of Classification Search
None
See application file for complete search history.

(56) References Cited

U.S. PATENT DOCUMENTS

| | | |
|---|---|---|
| 3,388,461 A | 6/1968 | Lins |
| 4,138,190 A | 2/1979 | Bryngdahl |

(Continued)

FOREIGN PATENT DOCUMENTS

| | | |
|---|---|---|
| BY | 12235 | 8/2009 |
| CA | 2637535 | 8/2007 |

(Continued)

OTHER PUBLICATIONS

Eichenholz, "Photonic-crystal fibers have many uses," Optoelectronics World, 4 pages (Aug. 2004).

(Continued)

*Primary Examiner* — Michael Stahl
(74) *Attorney, Agent, or Firm* — Klarquist Sparkman, LLP

(57) ABSTRACT

A method includes generating a multimode laser beam having an initial beam parameter product (bpp) and directing the multimode laser beam to an input end of a fiber so as to produce an output beam at an output of the fiber with a final bpp that is greater than the initial bpp. Another method includes measuring a base bpp associated with a multimode laser beam generated from a laser source and emitted from an output fiber output end, determining a bpp increase for the multimode laser beam, and selecting a bpp increasing optical fiber having an input end and an output end so that the multimode laser beam with the base bpp coupled to the input end has an output bpp at the output end of the bpp increasing optical fiber corresponding to the determined bpp increase.

24 Claims, 4 Drawing Sheets

(56) References Cited

U.S. PATENT DOCUMENTS

| | | |
|---|---|---|
| 4,252,403 A | 2/1981 | Salisbury |
| 4,266,851 A | 5/1981 | Salisbury |
| 4,475,027 A | 10/1984 | Pressley |
| 4,475,789 A | 10/1984 | Kahn |
| 4,713,518 A | 12/1987 | Yamazaki et al. |
| 4,863,538 A | 9/1989 | Deckard |
| 4,953,947 A | 9/1990 | Bhagavatula |
| 4,998,797 A | 3/1991 | van den Bergh et al. |
| 5,008,555 A | 4/1991 | Mundy |
| 5,082,349 A | 1/1992 | Cordova-Plaza et al. |
| 5,153,773 A | 10/1992 | Muraki et al. |
| 5,231,464 A | 7/1993 | Ichimura et al. |
| 5,237,150 A | 8/1993 | Karube |
| 5,252,991 A | 10/1993 | Storlie et al. |
| 5,319,195 A | 6/1994 | Jones et al. |
| 5,463,497 A | 10/1995 | Muraki et al. |
| 5,475,415 A | 12/1995 | Noethen |
| 5,475,704 A | 12/1995 | Lomashevich |
| 5,509,597 A | 4/1996 | Laferriere |
| 5,523,543 A | 6/1996 | Hunter, Jr. et al. |
| 5,566,196 A | 10/1996 | Scifres |
| 5,684,642 A | 11/1997 | Zumoto et al. |
| 5,745,284 A | 4/1998 | Goldberg et al. |
| 5,748,824 A | 5/1998 | Smith |
| 5,761,234 A | 6/1998 | Craig et al. |
| 5,818,630 A | 10/1998 | Fermann et al. |
| 5,864,430 A | 1/1999 | Dickey et al. |
| 5,903,696 A | 5/1999 | Krivoshlykov |
| 5,909,306 A | 6/1999 | Goldberg et al. |
| 5,932,119 A | 8/1999 | Kaplan et al. |
| 5,986,807 A | 11/1999 | Fork |
| 5,999,548 A | 12/1999 | Mori et al. |
| 6,072,184 A | 6/2000 | Okino et al. |
| 6,132,104 A | 10/2000 | Bliss et al. |
| 6,265,710 B1 | 7/2001 | Miller et al. |
| 6,310,995 B1 | 10/2001 | Saini et al. |
| 6,330,382 B1 | 12/2001 | Harshbarger et al. |
| RE37,585 E | 3/2002 | Mourou et al. |
| 6,353,203 B1 | 3/2002 | Hokodate et al. |
| 6,362,004 B1 | 3/2002 | Noblett |
| 6,417,963 B1 | 7/2002 | Ohishi et al. |
| 6,426,840 B1 | 7/2002 | Partanen et al. |
| 6,433,301 B1 | 8/2002 | Dunsky et al. |
| 6,434,177 B1 | 8/2002 | Jurgensen |
| 6,434,302 B1 | 8/2002 | Fidric et al. |
| 6,483,973 B1 | 11/2002 | Mazzarese et al. |
| 6,490,376 B1 | 12/2002 | Au et al. |
| 6,496,301 B1 | 12/2002 | Koplow et al. |
| 6,542,665 B2 | 4/2003 | Reed et al. |
| 6,556,340 B1 | 4/2003 | Wysocki et al. |
| 6,569,382 B1 | 5/2003 | Edman et al. |
| 6,577,314 B1 | 6/2003 | Yoshida et al. |
| 6,639,177 B2 | 10/2003 | Ehrmann et al. |
| 6,671,293 B2 | 12/2003 | Kopp et al. |
| 6,711,918 B1 | 3/2004 | Kliner et al. |
| 6,724,528 B2 | 4/2004 | Koplow et al. |
| 6,772,611 B2 | 8/2004 | Kliner et al. |
| 6,777,645 B2 | 8/2004 | Ehrmann et al. |
| 6,779,364 B2 | 8/2004 | Tankala et al. |
| 6,801,550 B1 | 10/2004 | Snell et al. |
| 6,819,815 B1 | 11/2004 | Corbalis et al. |
| 6,825,974 B2 | 11/2004 | Kliner et al. |
| 6,839,163 B1 | 1/2005 | Jakobson et al. |
| 6,882,786 B1 | 4/2005 | Kliner et al. |
| 6,895,154 B2 | 5/2005 | Johnson et al. |
| 6,917,742 B2 | 7/2005 | Po |
| 6,941,053 B2 | 9/2005 | Lauzon et al. |
| 6,963,062 B2 | 11/2005 | Cyr et al. |
| 6,989,508 B2 | 1/2006 | Ehrmann et al. |
| 7,068,900 B2 | 6/2006 | Croteau et al. |
| 7,079,566 B2 | 7/2006 | Kido et al. |
| 7,099,533 B1 | 8/2006 | Chenard |
| 7,099,535 B2 | 8/2006 | Bhagavatula et al. |
| 7,116,887 B2 | 10/2006 | Farroni et al. |
| 7,146,073 B2 | 12/2006 | Wan |
| 7,148,447 B2 | 12/2006 | Ehrmann et al. |
| 7,151,787 B2 | 12/2006 | Kulp et al. |
| 7,151,788 B2 | 12/2006 | Imakado et al. |
| 7,157,661 B2 | 1/2007 | Amako |
| 7,170,913 B2 | 1/2007 | Araujo et al. |
| 7,184,630 B2 | 2/2007 | Kwon et al. |
| 7,193,771 B1 | 3/2007 | Smith et al. |
| 7,218,440 B2 | 5/2007 | Green |
| 7,235,150 B2 | 6/2007 | Bischel et al. |
| 7,257,293 B1 | 8/2007 | Fini et al. |
| 7,317,857 B2 | 1/2008 | Manyam et al. |
| 7,318,450 B2 | 1/2008 | Nobili |
| 7,349,123 B2 | 3/2008 | Clarke et al. |
| 7,359,604 B2 | 4/2008 | Po |
| 7,373,070 B2 | 5/2008 | Wetter et al. |
| 7,382,389 B2 | 6/2008 | Cordingley et al. |
| 7,394,476 B2 | 7/2008 | Cordingley et al. |
| 7,463,805 B2 | 12/2008 | Li et al. |
| 7,526,166 B2 | 4/2009 | Bookbinder et al. |
| 7,527,977 B1 | 5/2009 | Fruetel et al. |
| 7,537,395 B2 | 5/2009 | Savage-Leuchs |
| 7,592,568 B2 | 9/2009 | Varnham et al. |
| 7,593,435 B2 | 9/2009 | Gapontsev et al. |
| 7,622,710 B2 | 11/2009 | Gluckstad |
| 7,628,865 B2 | 12/2009 | Singh |
| 7,748,913 B2 | 7/2010 | Oba |
| 7,764,854 B2 | 7/2010 | Fini |
| 7,781,778 B2 | 8/2010 | Moon et al. |
| 7,783,149 B2 | 8/2010 | Fini |
| 7,835,608 B2 | 11/2010 | Minelly et al. |
| 7,839,901 B2 | 11/2010 | Meleshkevich et al. |
| 7,876,495 B1 | 1/2011 | Minelly |
| 7,880,961 B1 | 2/2011 | Feve et al. |
| 7,920,767 B2 | 4/2011 | Fini |
| 7,924,500 B1 | 4/2011 | Minelly |
| 7,925,125 B2 | 4/2011 | Cyr et al. |
| 7,955,905 B2 | 6/2011 | Cordingley et al. |
| 7,955,906 B2 | 6/2011 | Cordingley et al. |
| 8,027,555 B1 | 9/2011 | Kliner et al. |
| 8,071,912 B2 | 12/2011 | Costin, Sr. et al. |
| 8,217,304 B2 | 7/2012 | Cordingley et al. |
| 8,237,788 B2 | 8/2012 | Cooper et al. |
| 8,243,764 B2 | 8/2012 | Tucker et al. |
| 8,251,475 B2 | 8/2012 | Murray et al. |
| 8,269,108 B2 | 9/2012 | Kunishi et al. |
| 8,270,441 B2 | 9/2012 | Rogers et al. |
| 8,270,445 B2 | 9/2012 | Morasse et al. |
| 8,278,591 B2 | 10/2012 | Chouf et al. |
| 8,288,679 B2 | 10/2012 | Unrath |
| 8,288,683 B2 | 10/2012 | Jennings et al. |
| 8,310,009 B2 | 11/2012 | Saran et al. |
| 8,317,413 B2 | 11/2012 | Fisher et al. |
| 8,362,391 B2 | 1/2013 | Partlo et al. |
| 8,395,084 B2 | 3/2013 | Tanaka |
| 8,404,998 B2 | 3/2013 | Unrath et al. |
| 8,411,710 B2 | 4/2013 | Tamaoki |
| 8,414,264 B2 | 4/2013 | Bolms et al. |
| 8,415,613 B2 | 4/2013 | Heyn et al. |
| 8,433,161 B2 | 4/2013 | Langseth et al. |
| 8,442,303 B2 | 5/2013 | Cheng et al. |
| 8,472,099 B2 | 6/2013 | Fujino et al. |
| 8,509,577 B2 | 8/2013 | Liu |
| 8,526,110 B1 | 9/2013 | Honea et al. |
| 8,537,871 B2 | 9/2013 | Saracco |
| 8,542,145 B2 | 9/2013 | Galati |
| 8,542,971 B2 | 9/2013 | Chatigny |
| 8,593,725 B2 | 11/2013 | Kliner et al. |
| 8,711,471 B2 | 4/2014 | Liu et al. |
| 8,728,591 B2 | 5/2014 | Inada et al. |
| 8,755,649 B2 | 6/2014 | Yilmaz et al. |
| 8,774,237 B2 | 7/2014 | Maryashin et al. |
| 8,781,269 B2 | 7/2014 | Huber et al. |
| 8,809,734 B2 | 8/2014 | Cordingley et al. |
| 8,835,804 B2 | 9/2014 | Farmer et al. |
| 8,861,910 B2 | 10/2014 | Yun |
| 8,873,134 B2 | 10/2014 | Price et al. |
| 8,934,742 B2 | 1/2015 | Voss et al. |
| 8,947,768 B2 | 2/2015 | Kliner et al. |
| 8,948,218 B2 | 2/2015 | Gapontsev et al. |

(56) References Cited

U.S. PATENT DOCUMENTS

| | | |
|---|---|---|
| 8,953,914 B2 | 2/2015 | Genier |
| 9,014,220 B2 | 4/2015 | Minelly et al. |
| 9,136,663 B2 | 9/2015 | Taya |
| 9,140,873 B2 | 9/2015 | Minelly |
| 9,158,066 B2 | 10/2015 | Fini et al. |
| 9,170,359 B2 | 10/2015 | Van Bommel et al. |
| 9,170,367 B2 | 10/2015 | Messerly et al. |
| 9,207,395 B2 | 12/2015 | Fini et al. |
| 9,217,825 B2 | 12/2015 | Ye et al. |
| 9,250,390 B2 | 2/2016 | Muendel et al. |
| 9,310,560 B2 | 4/2016 | Chann et al. |
| 9,322,989 B2 | 4/2016 | Fini et al. |
| 9,325,151 B1 | 4/2016 | Fini et al. |
| 9,339,890 B2 | 5/2016 | Woods et al. |
| 9,366,887 B2 | 6/2016 | Tayebati et al. |
| 9,397,466 B2 | 7/2016 | McComb et al. |
| 9,431,786 B2 | 8/2016 | Savage-Leuchs |
| 9,442,252 B2 | 9/2016 | Genier |
| 9,482,821 B2 | 11/2016 | Huber et al. |
| 9,496,683 B1 | 11/2016 | Kanskar |
| 9,507,084 B2 | 11/2016 | Fini et al. |
| 9,537,042 B2 | 1/2017 | Dittli et al. |
| 9,547,121 B2 | 1/2017 | Hou et al. |
| 9,634,462 B2 | 4/2017 | Kliner et al. |
| 9,823,422 B2 | 11/2017 | Muendel et al. |
| 9,837,783 B2 | 12/2017 | Kliner et al. |
| 2001/0050364 A1 | 12/2001 | Tanaka et al. |
| 2002/0097963 A1 | 7/2002 | Ukechi et al. |
| 2002/0146202 A1 | 10/2002 | Reed et al. |
| 2002/0147394 A1 | 10/2002 | Ellingsen |
| 2002/0158052 A1 | 10/2002 | Ehrmann et al. |
| 2002/0159685 A1 | 10/2002 | Cormack |
| 2002/0168139 A1 | 11/2002 | Clarkson et al. |
| 2002/0176676 A1 | 11/2002 | Johnson et al. |
| 2002/0181512 A1 | 12/2002 | Wang et al. |
| 2003/0031407 A1 | 2/2003 | Weisberg et al. |
| 2003/0032204 A1 | 2/2003 | Walt et al. |
| 2003/0043384 A1 | 3/2003 | Hill |
| 2003/0059184 A1 | 3/2003 | Tankala et al. |
| 2003/0095578 A1 | 5/2003 | Kopp et al. |
| 2003/0118305 A1 | 6/2003 | Reed et al. |
| 2003/0152342 A1 | 8/2003 | Wang et al. |
| 2003/0174387 A1 | 9/2003 | Eggleton et al. |
| 2003/0213998 A1 | 11/2003 | Hsu et al. |
| 2003/0219208 A1 | 11/2003 | Kwon et al. |
| 2004/0013379 A1 | 1/2004 | Johnson et al. |
| 2004/0031779 A1 | 2/2004 | Cahill et al. |
| 2004/0086245 A1 | 5/2004 | Farroni et al. |
| 2004/0112634 A1 | 6/2004 | Tanaka et al. |
| 2004/0126059 A1 | 7/2004 | Bhagavatula et al. |
| 2004/0207936 A1 | 10/2004 | Yamamoto et al. |
| 2004/0208464 A1 | 10/2004 | Po |
| 2005/0002607 A1 | 1/2005 | Neuhaus et al. |
| 2005/0027288 A1 | 2/2005 | Oyagi et al. |
| 2005/0041697 A1 | 2/2005 | Seifert et al. |
| 2005/0168847 A1 | 8/2005 | Sasaki |
| 2005/0185892 A1 | 8/2005 | Kwon et al. |
| 2005/0191017 A1 | 9/2005 | Croteau et al. |
| 2005/0233557 A1 | 10/2005 | Tanaka et al. |
| 2005/0259944 A1 | 11/2005 | Anderson et al. |
| 2005/0265678 A1 | 12/2005 | Manyam et al. |
| 2005/0271340 A1 | 12/2005 | Weisberg et al. |
| 2006/0024001 A1 | 2/2006 | Kobayashi |
| 2006/0054606 A1 | 3/2006 | Amako |
| 2006/0067632 A1 | 3/2006 | Broeng et al. |
| 2006/0219673 A1 | 10/2006 | Varnham et al. |
| 2006/0275705 A1 | 12/2006 | Dorogy et al. |
| 2006/0291788 A1 | 12/2006 | Po |
| 2007/0026676 A1 | 2/2007 | Li et al. |
| 2007/0041083 A1 | 2/2007 | Di Teodoro et al. |
| 2007/0047066 A1 | 3/2007 | Green |
| 2007/0075060 A1 | 4/2007 | Shedlov et al. |
| 2007/0104436 A1 | 5/2007 | Li et al. |
| 2007/0104438 A1 | 5/2007 | Varnham |
| 2007/0147751 A1 | 6/2007 | Fini |
| 2007/0178674 A1 | 8/2007 | Imai et al. |
| 2007/0195850 A1 | 8/2007 | Schluter et al. |
| 2007/0215820 A1 | 9/2007 | Cordingley et al. |
| 2007/0251543 A1 | 11/2007 | Singh |
| 2008/0037604 A1 | 2/2008 | Savage-Leuchs |
| 2008/0124022 A1 | 5/2008 | Ivtsenkov |
| 2008/0141724 A1 | 6/2008 | Fuflyigin |
| 2008/0154249 A1 | 6/2008 | Cao |
| 2008/0181567 A1 | 7/2008 | Bookbinder et al. |
| 2008/0231939 A1 | 9/2008 | Gluckstad |
| 2008/0246024 A1 | 10/2008 | Touwslager et al. |
| 2009/0034059 A1 | 2/2009 | Fini |
| 2009/0052849 A1 | 2/2009 | Lee et al. |
| 2009/0059353 A1 | 3/2009 | Fini |
| 2009/0080472 A1 | 3/2009 | Yao et al. |
| 2009/0080835 A1 | 3/2009 | Frith |
| 2009/0122377 A1 | 5/2009 | Wagner |
| 2009/0127477 A1 | 5/2009 | Tanaka et al. |
| 2009/0129237 A1 | 5/2009 | Chen et al. |
| 2009/0152247 A1 | 6/2009 | Jennings et al. |
| 2009/0154512 A1 | 6/2009 | Simons et al. |
| 2009/0175301 A1 | 7/2009 | Li et al. |
| 2009/0274833 A1 | 11/2009 | Li |
| 2009/0297108 A1 | 12/2009 | Ushiwata et al. |
| 2009/0297140 A1 | 12/2009 | Heismann et al. |
| 2009/0314752 A1 | 12/2009 | Manens et al. |
| 2009/0324233 A1 | 12/2009 | Samartsev et al. |
| 2010/0025387 A1 | 2/2010 | Arai et al. |
| 2010/0067013 A1 | 3/2010 | Howieson et al. |
| 2010/0067860 A1 | 3/2010 | Ikeda et al. |
| 2010/0116794 A1 | 5/2010 | Taido et al. |
| 2010/0129029 A1 | 5/2010 | Westbrook |
| 2010/0150186 A1 | 6/2010 | Mizuuchi |
| 2010/0163537 A1 | 7/2010 | Furuta et al. |
| 2010/0187409 A1 | 7/2010 | Cristiani et al. |
| 2010/0225974 A1 | 9/2010 | Sandstrom |
| 2010/0230665 A1 | 9/2010 | Verschuren et al. |
| 2010/0251437 A1 | 9/2010 | Heyn et al. |
| 2010/0252543 A1 | 10/2010 | Manens et al. |
| 2011/0058250 A1 | 3/2011 | Liu et al. |
| 2011/0080476 A1 | 4/2011 | Dinauer et al. |
| 2011/0091155 A1 | 4/2011 | Yilmaz et al. |
| 2011/0127697 A1 | 6/2011 | Milne |
| 2011/0133365 A1 | 6/2011 | Ushimaru et al. |
| 2011/0163077 A1 | 7/2011 | Partlo et al. |
| 2011/0187025 A1 | 8/2011 | Costin, Sr. |
| 2011/0243161 A1 | 10/2011 | Tucker et al. |
| 2011/0248005 A1 | 10/2011 | Briand et al. |
| 2011/0278277 A1 | 11/2011 | Stork Genannt Wersborg |
| 2011/0279826 A1 | 11/2011 | Miura et al. |
| 2011/0297229 A1 | 12/2011 | Gu et al. |
| 2011/0305249 A1 | 12/2011 | Gapontsev et al. |
| 2011/0305256 A1 | 12/2011 | Chann |
| 2011/0316029 A1 | 12/2011 | Maruyama et al. |
| 2012/0002919 A1 | 1/2012 | Liu |
| 2012/0051084 A1* | 3/2012 | Yalin .................. G02B 6/028 362/553 |
| 2012/0051692 A1 | 3/2012 | Seo |
| 2012/0082410 A1 | 4/2012 | Peng et al. |
| 2012/0127097 A1 | 5/2012 | Gaynor et al. |
| 2012/0127563 A1 | 5/2012 | Farmer et al. |
| 2012/0128294 A1 | 5/2012 | Voss et al. |
| 2012/0145685 A1 | 6/2012 | Ream et al. |
| 2012/0148823 A1 | 6/2012 | Chu |
| 2012/0156458 A1 | 6/2012 | Chu |
| 2012/0168411 A1 | 7/2012 | Farmer et al. |
| 2012/0262781 A1 | 10/2012 | Price et al. |
| 2012/0295071 A1 | 11/2012 | Sato |
| 2012/0301733 A1 | 11/2012 | Eckert et al. |
| 2012/0301737 A1 | 11/2012 | Labelle et al. |
| 2012/0321262 A1 | 12/2012 | Goell et al. |
| 2012/0329974 A1 | 12/2012 | Inada et al. |
| 2013/0005139 A1 | 1/2013 | Krasnov et al. |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0038923 A1 | 2/2013 | Jespersen et al. |
| 2013/0087694 A1 | 4/2013 | Creeden et al. |
| 2013/0095260 A1 | 4/2013 | Bovatsek et al. |

(56) References Cited

U.S. PATENT DOCUMENTS

| | | |
|---|---|---|
| 2013/0134637 A1 | 5/2013 | Wiesner et al. |
| 2013/0146569 A1* | 6/2013 | Woods .................. B23K 26/06 219/121.64 |
| 2013/0148925 A1 | 6/2013 | Muendel et al. |
| 2013/0182725 A1 | 7/2013 | Karlsen et al. |
| 2013/0202264 A1 | 8/2013 | Messerly et al. |
| 2013/0223792 A1 | 8/2013 | Huber et al. |
| 2013/0228442 A1 | 9/2013 | Mohaptatra et al. |
| 2013/0251324 A1 | 9/2013 | Fini et al. |
| 2013/0272657 A1 | 10/2013 | Salokatve |
| 2013/0299468 A1 | 11/2013 | Unrath et al. |
| 2013/0308661 A1 | 11/2013 | Nishimura et al. |
| 2013/0343703 A1 | 12/2013 | Genier |
| 2014/0044143 A1* | 2/2014 | Clarkson ............ G02B 27/0927 372/72 |
| 2014/0086526 A1 | 3/2014 | Starodubov et al. |
| 2014/0104618 A1 | 4/2014 | Potsaid et al. |
| 2014/0155873 A1 | 6/2014 | Bor |
| 2014/0177038 A1 | 6/2014 | Rrataj et al. |
| 2014/0178023 A1 | 6/2014 | Oh et al. |
| 2014/0205236 A1 | 7/2014 | Noguchi et al. |
| 2014/0233900 A1 | 8/2014 | Hugonnot et al. |
| 2014/0241385 A1 | 8/2014 | Fomin et al. |
| 2014/0259589 A1 | 9/2014 | Xu et al. |
| 2014/0263209 A1 | 9/2014 | Burris et al. |
| 2014/0268310 A1 | 9/2014 | Ye et al. |
| 2014/0271328 A1 | 9/2014 | Burris et al. |
| 2014/0313513 A1 | 10/2014 | Liao |
| 2014/0319381 A1 | 10/2014 | Gross |
| 2014/0332254 A1 | 11/2014 | Pellerite et al. |
| 2014/0333931 A1 | 11/2014 | Lu et al. |
| 2014/0334788 A1 | 11/2014 | Fini et al. |
| 2015/0049987 A1 | 2/2015 | Grasso et al. |
| 2015/0104139 A1 | 4/2015 | Brunet et al. |
| 2015/0125114 A1 | 5/2015 | Genier |
| 2015/0125115 A1 | 5/2015 | Genier |
| 2015/0138630 A1 | 5/2015 | Honea et al. |
| 2015/0165556 A1 | 6/2015 | Jones et al. |
| 2015/0217402 A1 | 8/2015 | Hesse et al. |
| 2015/0241632 A1 | 8/2015 | Chann et al. |
| 2015/0270089 A1 | 9/2015 | Ghanea-Hercock |
| 2015/0283613 A1 | 10/2015 | Backlund et al. |
| 2015/0293300 A1 | 10/2015 | Fini et al. |
| 2015/0293306 A1 | 10/2015 | Huber et al. |
| 2015/0314612 A1 | 11/2015 | Balasini et al. |
| 2015/0316716 A1 | 11/2015 | Fini et al. |
| 2015/0331205 A1* | 11/2015 | Tayebati ............. G02B 6/4206 385/27 |
| 2015/0349481 A1 | 12/2015 | Kliner |
| 2015/0352664 A1 | 12/2015 | Errico et al. |
| 2015/0372445 A1 | 12/2015 | Harter |
| 2015/0378184 A1 | 12/2015 | Tayebati et al. |
| 2016/0013607 A1 | 1/2016 | McComb et al. |
| 2016/0052162 A1 | 2/2016 | Colin et al. |
| 2016/0059354 A1 | 3/2016 | Sercel et al. |
| 2016/0097903 A1 | 4/2016 | Li et al. |
| 2016/0104995 A1 | 4/2016 | Savage-Leuchs |
| 2016/0114431 A1 | 4/2016 | Cheverton et al. |
| 2016/0116679 A1 | 4/2016 | Muendel et al. |
| 2016/0158889 A1 | 6/2016 | Carter et al. |
| 2016/0187646 A1 | 6/2016 | Ehrmann |
| 2016/0207111 A1 | 7/2016 | Robrecht et al. |
| 2016/0218476 A1 | 7/2016 | Kliner et al. |
| 2016/0285227 A1 | 9/2016 | Farrow et al. |
| 2016/0294150 A1 | 10/2016 | Johnson |
| 2016/0320565 A1 | 11/2016 | Brown et al. |
| 2016/0320685 A1 | 11/2016 | Tayebati et al. |
| 2017/0003461 A1 | 1/2017 | Tayebati et al. |
| 2017/0090119 A1 | 3/2017 | Logan et al. |
| 2017/0110845 A1 | 4/2017 | Hou et al. |
| 2017/0120537 A1 | 5/2017 | DeMuth et al. |
| 2017/0162999 A1 | 6/2017 | Saracco et al. |
| 2017/0271837 A1 | 9/2017 | Hemenway et al. |
| 2017/0293084 A1* | 10/2017 | Zhou ........................ G02B 6/32 |
| 2017/0336580 A1 | 11/2017 | Tayebati et al. |
| 2017/0363810 A1* | 12/2017 | Holland .................. G02B 6/26 |
| 2018/0059343 A1 | 3/2018 | Kliner |

FOREIGN PATENT DOCUMENTS

| | | |
|---|---|---|
| CN | 1584644 | 2/2005 |
| CN | 1617003 | 5/2005 |
| CN | 1217030 C | 8/2005 |
| CN | 1926460 | 3/2007 |
| CN | 1966224 | 5/2007 |
| CN | 1327254 | 7/2007 |
| CN | 101143405 | 3/2008 |
| CN | 101303269 | 11/2008 |
| CN | 101314196 | 12/2008 |
| CN | 101733561 | 6/2010 |
| CN | 101836309 | 9/2010 |
| CN | 102007653 | 4/2011 |
| CN | 201783759 | 4/2011 |
| CN | 102084282 | 6/2011 |
| CN | 102176104 | 9/2011 |
| CN | 102207618 | 10/2011 |
| CN | 102301200 | 12/2011 |
| CN | 102441740 | 5/2012 |
| CN | 102448623 | 5/2012 |
| CN | 102481664 | 5/2012 |
| CN | 102782540 | 11/2012 |
| CN | 102844942 | 12/2012 |
| CN | 103056513 | 4/2013 |
| CN | 103173760 | 6/2013 |
| CN | 103490273 | 1/2014 |
| CN | 103521920 | 1/2014 |
| CN | 103606803 | 2/2014 |
| CN | 103999302 | 8/2014 |
| CN | 104136952 | 11/2014 |
| CN | 104169763 | 11/2014 |
| CN | 104999670 | 10/2015 |
| CN | 105383060 | 3/2016 |
| DE | 3833992 | 4/1990 |
| DE | 4200587 | 4/1993 |
| DE | 4437284 | 4/1996 |
| DE | 203 20 269 | 4/2004 |
| DE | 10321102 | 12/2004 |
| DE | 60312826 | 1/2008 |
| DE | 102009026526 | 12/2010 |
| DE | 102013205029 | 9/2014 |
| DE | 102013215362 | 2/2015 |
| DE | 202016004237 | 8/2016 |
| DE | 102015103127 | 9/2016 |
| EP | 0366856 | 5/1990 |
| EP | 0731743 | 9/1996 |
| EP | 1238745 | 9/2002 |
| EP | 1681542 | 7/2006 |
| EP | 1800700 | 6/2007 |
| EP | 1974848 | 10/2008 |
| EP | 1266259 | 5/2011 |
| EP | 2587564 | 5/2013 |
| EP | 2642246 | 9/2013 |
| EP | 2886226 | 6/2015 |
| JP | H02220314 | 9/1990 |
| JP | H11780 | 1/1999 |
| JP | 2008-281395 | 11/2000 |
| JP | 2003-129862 | 5/2003 |
| JP | 2003200286 | 7/2003 |
| JP | 2004291031 | 10/2004 |
| JP | 2006-098085 | 4/2006 |
| JP | 2006-106227 | 4/2006 |
| JP | 2009-142866 | 7/2009 |
| JP | 2009-248157 | 10/2009 |
| JP | 2012-059920 | 3/2012 |
| KR | 10-2011-0109957 | 10/2011 |
| RU | 2008742 | 2/1994 |
| RU | 2021881 | 10/1994 |
| RU | 2365476 | 8/2009 |
| RU | 2528287 | 9/2014 |
| RU | 2015112812 | 10/2016 |
| TW | 553430 | 9/2003 |
| TW | 200633062 | 9/2006 |
| TW | I271904 | 1/2007 |

(56) References Cited

FOREIGN PATENT DOCUMENTS

| TW | 200707466 | 2/2007 |
|---|---|---|
| TW | 201307949 | 2/2013 |
| WO | WO 1995/011100 | 4/1995 |
| WO | WO 1995/011101 | 4/1995 |
| WO | WO 2003/044914 | 5/2003 |
| WO | WO 2004/027477 | 4/2004 |
| WO | WO 2009/155536 | 12/2009 |
| WO | WO 2010/029243 | 3/2010 |
| WO | WO 2011/124671 | 10/2011 |
| WO | WO 2011/146407 | 11/2011 |
| WO | WO 2012/102655 | 8/2012 |
| WO | WO 2013/090236 | 6/2013 |
| WO | WO 2014/074947 | 5/2014 |
| WO | WO 2014/154901 | 10/2014 |
| WO | WO 2014/179345 | 11/2014 |
| WO | WO 2014/180870 | 11/2014 |
| WO | WO 2015/156281 | 10/2015 |
| WO | WO 2015/189883 | 12/2015 |
| WO | WO 2016/061657 | 4/2016 |
| WO | WO 2017/008022 | 1/2017 |
| WO | WO 2017/136831 A1 * | 8/2017 |

OTHER PUBLICATIONS

Final Office action from U.S. Appl. No. 15/607,399, dated May 3, 2018, 31 pages.
Final Office action from U.S. Appl. No. 15/607,410, dated May 11, 2018, 29 pages.
First Office Action for related Chinese Application No. 201610051671. X, dated Jun. 4, 2018, 25 pages (w/ English translation).
Injeyan et al., "Introduction to Optical Fiber Lasers," High-Power Laser Handbook, pp. 436-439 (2011).
"Lasers & Fibers," NKT Photonics, available at: https://www.nktphotonics.com/lasers-fibers/technology/photonic-crystal-fibers/, 4 pages, retrieved Feb. 13, 2018.
Russell, "Photonic-Crystal Fibers," IEEE JLT, 24:4729-4749 (Dec. 2006).
Saleh et al., "Chapter 9.4 Holey and Photonic-Crystal Fibers," Fundamentals of Photonics, Second Edition, pp. 359-362 (2007).
Wetter et al., "High power cladding light strippers," Proc. of SPIE, 6873:687327-1-687327-8 (Jan. 21, 2008).
"Canunda, Application Note," CAILabs, available at: www.cailabs.com, 16 pages (Jun. 10, 2015).
"Canunda, Application Note: Flexible high-power laser beam shaping," CAILabs, available at: www.cailabs.com, 22 pages, date unknown (U.S. Appl. No. 15/607,399).
Fuse, "Beam Shaping for Advanced Laser Materials Processing," Laser Technik Journal, pp. 19-22 (Feb. 2015).
Garcia et al., "Fast adaptive laser shaping based on multiple laser incoherent combining," Proc. of SPIE, 10097:1009705-1-1009705-15 (Feb. 22, 2017).
Huang et al., "All-fiber mode-group-selective photonic lantern using graded-index multimode fibers," Optics Express, 23:224-234 (Jan. 6, 2015).
International Search Report and Written Opinion from International Application No. PCT/US2018/024908, dated Jul. 19, 2018, 8 pages.
Jain et al., "Multi-element fiber technology for space-division multiplexing applications," Optics Express, 22:3787-3796 (Feb. 11, 2014).
Jin et al., "Mode Coupling Effects in Ring-Core Fibers for Space-Division Multiplexing Systems," Journal of Lightwave Technology, 34:3365-3372 (Jul. 15, 2016).
Newkirk et al., "Bending sensor combining multicore fiber with a mide-selective photonic lantern," Optics Letters, 40:5188-5191 (Nov. 15, 2015).
Office action from U.S. Appl. No. 15/607,411, dated Jun. 12, 2018, 19 pages.
SeGall et al., "Simultaneous laser mode conversion and beam combining using multiplexed volume phase elements," Advanced Solid-State Lasers Congress Technical Digest, Optical Society of America, paper AW2A.9, 3 pages (Oct. 27-Nov. 1, 2013).
Adelman et al., "Measurement of Relative State-to-State Rate Constants for the Reaction D+H$_2$(v, j) → HD(v', j')+H," J. Chem. Phys., 97:7323-7341 (Nov. 15, 1992).
Alfano et al., "Photodissociation and Recombination Dynamics of I$_2^-$ in Solution," Ultrafast Phenomena VIII, (Springer-Verlag, New York), pp. 653-655 (Jan. 1993).
"ARM," Coherent, available at: http://www.corelase.fi/products/arm/, 6 pages, retrieved May 26, 2017.
Bernasconi et al., "Kinetics of Ionization of Nitromethane and Phenylnitromethane by Amines and Carboxylate Ions in Me$_2$SO-ater Mixtures. Evidence of Ammonium Ion-Nitronate Ion Hydrogen Bonded Complex Formation in Me$_2$SO-Rich Solvent Mixtures," J. Org. Chem., 53:3342-3351 (Jul. 1988).
Blake et al., "The H+D$_2$ Reaction: HD(v=1, J) and HD(v=2, J) Distributions at a Collision Energy of 1.3 eV," Chem. Phys. Lett., 153:365-370 (Dec. 23, 1988).
Daniel et al., "Novel technique for mode selection in a large-mode-area fiber laser," Conference on Lasers and Electro-Optics 2010, OSA Technical Digest (CD) (Optical Society of America), paper CWC5, 2 pages (Jan. 2010).
Daniel et al., "Novel technique for mode selection in a multimode fiber laser," Optics Express, 19:12434-12439 (Jun. 20, 2011).
Di Teodoro et al., "Diffraction-Limited, 300-kW Peak-Power Pulses from a Coiled Multimode Fiber Amplifier," Optics Letters, 27:518-520 (May 2002).
Di Teodoro et al., "Diffraction-limited, 300-kW-peak-power Pulses from a Yb-doped Fiber Amplifier," Conference on Lasers and Electro-Optics, OSA Technical Digest (Optical Society of America, Washington, DC), p. 592-593 (May 22-24, 2002).
Di Teodoro et al., "High-peak-power pulsed fiber sources," Proc. of SPIE, 5448:561-571 (Sep. 20, 2004).
"Efficient and Simple Precision, Laser Processing Head PDT-B," HIGHYAG, 6 pages, (Jan. 2010).
"ENSIS Series," Amada America, Inc., available at: http://www.amada.com/america/ensis-3015-aj, 2 pages, retrieved May 26, 2017.
"EX-F Series," MC Machinery Systems, Inc., available at: https://www.mcmachinery.com/products-and-solutions/ex-f-series/, 2 pages, retrieved May 26, 2017.
Farrow et al., "Bend-Loss Filtered, Large-Mode-Area Fiber Amplifiers: Experiments and Modeling," Proceedings of the Solid State and Diode Laser Technology Review (Directed Energy Professional Society), P-9, 5 pages. (2006).
Farrow et al., "Compact Fiber Lasers for Efficient High-Power Generation," Proc. of SPIE, 6287:62870C-1-62870C-6 (Sep. 1, 2006).
Farrow et al., "Design of Refractive-Index and Rare-Earth-Dopant Distributions for Large-Mode-Area Fibers Used in Coiled High-Power Amplifiers," Proc. of SPIE, 6453:64531C-1-64531C-11 (Feb. 22, 2007).
Farrow et al., "High-Peak-Power (>1.2 MW) Pulsed Fiber Amplifier," Proc. of the SPIE, 6102:61020L-1-61020L-11 (Mar. 2006).
Farrow et al., "Numerical Modeling of Self-Focusing Beams in Fiber Amplifiers," Proc. of the SPIE, 6453:645309-1-645309-9 (2007).
Farrow et al., "Peak-Power Limits on Pulsed Fiber Amplifiers Imposed by Self-Focusing," Optics Lett., 31:3423-3425 (Dec. 1, 2006).
Fève et al., "Four-wave mixing in nanosecond pulsed fiber amplifiers," Optics Express, 15:4647-4662 (Apr. 16, 2007).
Fève et al., "Limiting Effects of Four-Wave Mixing in High-Power Pulsed Fiber Amplifiers," Proc. of the SPIE, 6453:64531P-1-64531P-11 (Feb. 22, 2007).
Final Office action from U.S. Appl. No. 15/607,411, dated Feb. 1, 2018, 27 pages.
Fini, "Bend-compensated design of large-mode-area fibers," Optics Letters, 31:1963-1965 (Jul. 1, 2006).
Fini, "Large mode area fibers with asymmetric bend compensation," Optics Express, 19:21868-21873 (Oct. 24, 2011).
Fini et al., "Bend-compensated large-mode-area fibers: achieving robust single-modedness with transformation optics," Optics Express, 21:19173-19179 (Aug. 12, 2013).

(56) References Cited

OTHER PUBLICATIONS

Fox et al., "Effect of low-earth orbit space on radiation-induced absorption in rare-earth-doped optical fibers," *J. Non-Cryst. Solids*, 378:79-88 (Oct. 15, 2013).
Fox et al., "Gamma Radiation Effects in Yb-Doped Optical Fiber," *Proc. of the SPIE*, 6453:645328-1-645328-9 (Feb. 23, 2007).
Fox et al., "Gamma-Radiation-Induced Photodarkening in Unpumped Optical Fibers Doped with Rare-Earth Constituents," *IEEE Trans. on Nuclear Science*, 57:1618-1625 (Jun. 2010).
Fox et al., "Investigation of radiation-induced photodarkening in passive erbium-, ytterbium-, and Yb/Er co-doped optical fibers," *Proc. of the SPIE*, 6713:67130R-1-67130R-9 (Sep. 26, 2007).
Fox et al., "Radiation damage effects in doped fiber materials," *Proc. of the SPIE*, 6873:68731F-1-68731F-9 (Feb. 22, 2008).
Fox et al., "Spectrally Resolved Transmission Loss in Gamma Irradiated Yb-Doped Optical Fibers," *IEEE J. Quant. Electron.*, 44:581-586 (Jun. 2008).
Fox et al., "Temperature and Dose-Rate Effects in Gamma Irradiated Rare-Earth Doped Fibers," *Proc. of SPIE*, 7095:70950B-1-70950B-8 (Aug. 26, 2008).
Ghasemi et al., "Beam shaping design for coupling high power diode laser stack to fiber," *Applied Optics*, 50:2927-2930 (Jun. 20, 2011).
Goers et al., "Development of a Compact Gas Imaging Sensor Employing cw Fiber-Amp-Pumped PPLN OPO," *Conference on Lasers and Electro-Optics*, OSA Technical Digest (Optical Society of America, Washington, DC), p. 521 (May 11, 2001).
Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).
Goldberg et al., "Deep UV Generation by Frequency Quadrupling of a High-Power GaAlAs Semiconductor Laser," *Optics Lett.*, 20:1145-1147 (May 15, 1995).
Goldberg et al., "High Efficiency 3 W Side-Pumped Yb Fiber Amplifier and Laser," *Conference on Lasers and Electro-Optics*, OSA Technical Digest (Optical Society of America, Washington, DC), p. 11-12 (May 24, 1999).
Goldberg et al., "Highly Efficient 4-W Yb-Doped Fiber Amplifier Pumped by a Broad-Stripe Laser Diode," *Optics Lett.*, 24:673-675 (May 15, 1999).
Goldberg et al., "High-Power Superfluorescent Source with a Side-Pumped Yb-Doped Double-Cladding Fiber," *Optics Letters*, 23:1037-1039 (Jul. 1, 1998).
Goldberg et al., "Tunable UV Generation at 286 nm by Frequency Tripling of a High-Power Modelocked Semiconductor Laser," *Optics Lett.*, 20:1640-1642 (Aug. 1, 1995).
Golub, "Laser Beam Splitting by Diffractive Optics," *Optics and Photonics News*, 6 pages (Feb. 2004).
Han et al., "Reshaping collimated laser beams with Gaussian profile to uniform profiles," *Applied Optics*, 22:3644-3647 (Nov. 15, 1983).
Headrick et al., "Application of laser photofragmentation-resonance enhanced multiphoton ionization to ion mobility spectrometry," *Applied Optics*, 49:2204-2214 (Apr. 10, 2010).
Hemenway et al., "Advances in high-brightness fiber-coupled laser modules for pumping multi-kW CW fiber lasers," Proceedings of SPIE, 10086:1008605-1-1008605-7 (Feb. 22, 2017).
Hemenway et al., "High-brightness, fiber-coupled pump modules in fiber laser applications," *Proc. of SPIE*, 8961:89611V-1-89611V-12 (Mar. 7, 2014).
Hoops et al., "Detection of mercuric chloride by photofragment emission using a frequency-converted fiber amplifier," *Applied Optics*, 46:4008-4014 (Jul. 1, 2007).
Hotoleanu et al., "High Order Modes Suppression in Large Mode Area Active Fibers by Controlling the Radial Distribution of the Rare Earth Dopant," *Proc. of the SPIE*, 6102:61021T-1-61021T-8 (Feb. 23, 2006).
"How to Select a Beamsplitter," IDEX—Optics & Photonics Marketplace, available at: https://www.cvilaseroptics.com/file/general/beamSplitters.pdf, 5 pages (Jan. 8, 2014).
Huang et al., "Double-cutting beam shaping technique for high-power diode laser area light source," *Optical Engineering*, 52:106108-1-106108-6 (Oct. 2013).
International Search Report and Written Opinion from International Application No. PCT/US2017/034848, dated Nov. 28, 2017, 15 pages.
Ishiguro et al., "High Efficiency 4-kW Fiber Laser Cutting Machine," *Rev. Laser Eng.*, 39:680-684 (May 21, 2011).
Johnson et al., "Experimental and Theoretical Study of Inhomogeneous Electron Transfer in Betaine: Comparisons of Measured and Predicted Spectral Dynamics," *Chem. Phys.*, 176:555-574 (Oct. 15, 1993).
Johnson et al., "Ultrafast Experiments on the Role of Vibrational Modes in Electron Transfer," *Pure and Applied Chem.*, 64:1219-1224 (May 1992).
Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page (Jun. 21-25, 2015).
Kliner et al., "4-kW fiber laser for metal cutting and welding," *Proc. of SPIE*, 7914:791418-791418-8 (Feb. 22, 2011).
Kliner et al., "Comparison of Experimental and Theoretical Absolute Rates for Intervalence Electron Transfer," *J. Am. Chem. Soc.*, 114:8323-8325 (Oct. 7, 1992).
Kliner et al., "Comparison of Experimental and Theoretical Integral Cross Sections for $D+H_2(v=1, j=1) \rightarrow HD(v'=1, j')+H$," *J. Chem. Phys.*, 95:1648-1662 (Aug. 1, 1991).
Kliner et al., "$D+H_2(v=1, J=1)$: Rovibronic State to Rovibronic State Reaction Dynamics," *J. Chem. Phys.*, 92:2107-2109 (Feb. 1, 1990).
Kliner et al., "Effect of Indistinguishable Nuclei on Product Rotational Distributions: $H+HI \rightarrow H_2+I$ reaction$^{a)}$," *J. Chem. Phys.*, 90:4625-4327 (Apr. 15, 1989).
Kliner et al., "Efficient second, third, fourth, and fifth harmonic generation of a Yb-doped fiber amplifier," *Optics Communications*, 210:393-398 (Sep. 15, 2002).
Kliner et al., "Efficient UV and Visible Generation Using a Pulsed Yb-Doped Fiber Amplifier," *Conference on Lasers and Electro-Optics*, OSA Technical Digest (Optical Society of America, Washington, DC), p. CPDC10-1-CPDC10-3 (May 19-22, 2002).
Kliner et al., "Efficient visible and UV generation by frequency conversion of a mode-filtered fiber amplifier," *Proc. of SPIE*, 4974:230-235 (Jul. 3, 2003).
Kliner et al., "Fiber laser allows processing of highly reflective materials," *Industrial Laser Solutions*, 31:1-9 (Mar. 16, 2016).
Kliner et al., "High-Power Fiber Lasers," *Photonics & Imaging Technology*, pp. 2-5 (Mar. 2017).
Kliner et al., "Laboratory Investigation of the Catalytic Reduction Technique for Detection of Atmospheric $NO_y$," *J. Geophys. Res.*, 102:10759-10776 (May 20, 1997).
Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).
Kliner et al., "Measurements of Ground-State OH Rotational Energy-Transfer Rates," *J. Chem. Phys.*, 110:412-422 (Jan. 1, 1999).
Kliner et al., "Mode-Filtered Fiber Amplifier," Sandia National Laboratories—Brochure, 44 pages (Sep. 13, 2007).
Kliner et al., "Narrow-Band, Tunable, Semiconductor-Laser-Based Source for Deep-UV Absorption Spectroscopy," *Optics Lett.*, 22:1418-1420 (Sep. 15, 1997).
Kliner et al., "Overview of Sandia's fiber laser program," *Proceedings of SPIE—The International Society for Optical Engineering*, 6952:695202-1-695202-12 (Apr. 14, 2008).
Kliner et al., "Photodissociation and Vibrational Relaxation of $I_2^-$ in Ethanol," *J. Chem. Phys.*, 98:5375-5389 (Apr. 1, 1993).
Kliner et al., "Photodissociation Dynamics of $I_2^-$ in Solution," *Ultrafast Reaction Dynamics and Solvent Effects*, (American Institute of Physics, New York), pp. 16-35 (Feb. 1994).
Kliner et al., "Polarization-Maintaining Amplifier Employing Double-Clad, Bow-Tie Fiber," *Optics Lett.*, 26:184-186 (Feb. 15, 2001).

(56) References Cited

OTHER PUBLICATIONS

Kliner et al., "Power Scaling of Diffraction-Limited Fiber Sources," *Proc. of SPIE*, 5647:550-556 (Feb. 21, 2005).
Kliner et al., "Power Scaling of Rare-Earth-Doped Fiber Sources," *Proc. of SPIE*, 5653:257-261 (Jan. 12, 2005).
Kliner et al., "Product Internal-State Distribution for the Reaction H+HI → $H_2$+I" *J. Chem. Phys.*, 95:1663-1670 (Aug. 1, 1991).
Kliner et al., "The D+$H_2$ Reaction: Comparison of Experiment with Quantum-Mechanical and Quasiclassical Calculations," *Chem. Phys. Lett.*, 166:107-111 (Feb. 16, 1990).
Kliner et al., "The H+para-$H_2$ reaction: Influence of dynamical resonances on $H_2$(v'=1, j'=1 and 3) Integral Cross Sections," *J. Chem. Phys.*, 94:1069-1080 (Jan. 15, 1991).
Koplow et al., A New Method for Side Pumping of Double-Clad Fiber Sources, *J. Quantum Electronics*, 39:529-540 (Apr. 4, 2003).
Koplow et al., "Compact 1-W Yb-Doped Double-Cladding Fiber Amplifier Using V-Groove Side-Pumping," *IEEE Photonics Technol. Lett.*, 10:793-795 (Jun. 1998).
Koplow et al., "Development of a Narrowband, Tunable, Frequency-Quadrupled Diode Laser for UV Absorption Spectroscopy," *Appl. Optics*, 37:3954-3960 (Jun. 20, 1998).
Koplow et al., "Diode-Bar Side-Pumping of Double-Clad Fibers," *Proc. of SPIE*, 5709:284-300 (Apr. 22, 2005).
Koplow et al., "High Power PM Fiber Amplifier and Broadband Source," *Optical Fiber Communication Conference*, OSA Technical Digest (Optical Society of America, Washington, DC), p. 12-13 (Mar. 7-10, 2000).
Koplow et al., "Polarization-Maintaining, Double-Clad Fiber Amplifier Employing Externally Applied Stress-Induced Birefringence," *Optics Lett.*, 25:387-389 (Mar. 15, 2000).
Koplow et al., "Single-mode operation of a coiled multimode fiber amplifier," *Optics Letters*, 25:442-444 (Apr. 1, 2000).
Koplow et al., Use of Bend Loss to Obtain Single-Transverse-Mode Operation of a Multimode Fiber Amplifier, *Conference on Lasers and Electro-Optics*, OSA Technical Digest (Optical Society of America, Washington, DC), p. 286-287 (May 7-12, 2000).
Koplow et al., "UV Generation by Frequency Quadrupling of a Yb-Doped Fiber Amplifier," *IEEE Photonics Technol. Lett.*, 10:75-77 (Jan. 1998).
Koponen et al., "Photodarkening Measurements in Large-Mode-Area Fibers," *Proc. of SPIE*, 6453:64531E-1-64531E-12 (Feb. 2007).
Kotlyar et al., "Asymmetric Bessel-Gauss beams," *J. Opt. Soc. Am. A*, 31:1977-1983 (Sep. 2014).
Kulp et al., "The application of quasi-phase-matched parametric light sources to practical infrared chemical sensing systems," *Appl. Phys. B*, 75:317-327 (Jun. 6, 2002).
"Laser cutting machines," TRUMPF, available at: http://www.us.trumpf.com/en/products/machine-tools/products/2d-laser-cutting/innovative-technology/brightline.html, 9 pages, retrieved May 26, 2017.
Longhi et al., "Self-focusing and nonlinear periodic beams in parabolic index optical fibres," *J. Opt. B: Quantum Semiclass. Opt.*, 6:S303-S308 (May 2004).
Maechling et al., "Sum Frequency Spectra in the C—H Stretch Region of Adsorbates on Iron," *Appl. Spectrosc.*, 47:167-172 (Feb. 1, 1993).
McComb et al., "Pulsed Yb:fiber system capable of >250 kW peak power with tunable pulses in the 50 ps to 1.5 ns range," *Proc. of SPIE*, 8601:86012T-1-86012T-11 (Mar. 22, 2013).
Moore et al., "Diode-bar side pumping of double-clad fibers," *Proc. of SPIE*, 6453:64530K-1-64530K-9 (Feb. 20, 2007).
Neuhauser et al., "State-to-State Rates for the D+$H_2$(v=1, j=1) →HD(v', j') +H Reaction: Predictions and Measurements," *Science*, 257:519-522 (Jul. 24, 1992).
Office action from U.S. Appl. No. 15/607,399, dated Sep. 20, 2017, 25 pages.
Office action from U.S. Appl. No. 15/607,411, dated Sep. 26, 2017, 15 pages.

Office action from U.S. Appl. No. 15/607,410, dated Oct. 3, 2017, 32 pages.
Price et al., "High-brightness fiber-coupled pump laser development," *Proc. of SPIE*, 7583:758308-1-758308-7 (Feb. 2010).
Rinnen et al., "Construction of a Shuttered Time-of-Flight Mass Spectrometer for Selective Ion Detection," *Rev. Sci. Instrum.*, 60:717-719 (Apr. 1989).
Rinnen et al., "Effect of Indistinguishable Nuclei on Product Rotational Distributions: D+DI →$D_2$+I," *Chem. Phys. Lett.*, 169:365-371 (Jun. 15, 1990).
Rinnen et al. "Quantitative Determination of HD Internal State Distributions via (2+1) REMPI," *Isr. J. Chem.*, 29:369-382 (Mar. 7, 1989).
Rinnen et al., "Quantitative determination of $H_2$, HD, and $D_2$ internal state distributions via (2+1) resonance-enhanced multiphoton ionization," *J. Chem. Phys.*, 95:214-225 (Jul. 1, 1991).
Rinnen et al., "The H+$D_2$Reaction: "Prompt" HD Distributions at High Collision Energies," *Chem. Phys. Lett.*, 153:371-375 (Dec. 23, 1988).
Rinnen et al., "The H+$D_2$ Reaction: Quantum State Distributions at Collision Energies of 1.3 and 0.55 eV," *J. Chem. Phys.*, 91:7514-7529 (Dec. 15, 1989).
Romero et al., "Lossless laser beam shaping," *J. Opt. Soc. Am. A*, 13:751-760 (Apr. 1996).
Sanchez-Rubio et al., "Wavelength Beam Combining for Power and Brightness Scaling of Laser Systems," *Lincoln Laboratory Journal*, 20:52-66 (2014).
Saracco et al., Compact, 17 W average power, 100 kW peak power, nanosecond fiber laser system, *Proc. of SPIE*, 8601:86012U-1-86012U-13 (Mar. 22, 2013).
Schrader et al., "Fiber-Based Laser with Tunable Repetition Rate, Fixed Pulse Duration, and Multiple Wavelength Output," *Proc. of the SPIE*, 6453:64530D-1-64530D-9 (Feb. 20, 2007).
Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).
Schrader et al., "Power scaling of fiber-based amplifiers seeded with microchip lasers," *Proc. of the SPIE*, 6871:68710T-1-68710T-11 (Feb. 2008).
Sheehan et al., "Faserlaser zur Bearbeitung hochreflektierender Materialien (Fiber laser processing of highly reflective materials)," *Laser*, 3:92-94 (Jun. 2017).
Sheehan et al. "High-brightness fiber laser advances remote laser processing," *Industrial Laser Solutions*, 31:1-9 (Nov. 2, 2016).
Sun et al., "Optical Surface Transformation: Changing the optical surface by homogeneous optic-null medium at will," *Scientific Reports*, 5:16032-1-16032-20 (Oct. 30, 2015).
Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).
Tominaga et al., "Ultrafast Studies of Intervalence Charge Transfer," *Ultrafast Phenomena VIII*, (Springer-Verlag, New York), pp. 582-584 (1993).
Xiao et al., "Fiber coupler for mode selection and high-efficiency pump coupling," *Optics Letters*, 38:1170-1172 (Apr. 1, 2013).
Yaney et al., "Distributed-Feedback Dye Laser for Picosecond UV and Visible Spectroscopy," *Rev. Sci. Instrum*, 71:1296-1305 (Mar. 2000).
Yu et al., "1.2-kW single-mode fiber laser based on 100-W high-brightness pump diodes," *Proc. of SPIE*, 8237:82370G-1-82370G-7 (Feb. 16, 2012).
Ghatak et al., "Design of Waveguide Refractive Index Profile to Obtain Flat Model Field," SPIE, 3666:40-44 (Apr. 1999).
International Search Report and Written Opinion for related International Application No. PCT/US2016/041526, dated Oct. 20, 2016, 6 pages.
International Search Report and Written Opinion for related International Application No. PCT/US2016/053807, 6 pages, dated Jan. 19, 2017.
"Triple Clad Ytterbium-Doped Polarization Maintaining Fibers," nuFERN Driven to Light Specifications, 1 page (Jan. 2006).

(56) References Cited

OTHER PUBLICATIONS

Varshney et al., "Design of a flat field fiber with very small dispersion slope," Optical Fiber Technology, 9(3):189-198 (Oct. 2003).
Advisory Action from U.S. Appl. No. 15/607,410, dated Sep. 24, 2018, 6 pages.
Alcock et al., Element Table, *Canadian Metallurgical Quarterly*, 23:309-311 (1984).
Affine Transformation—from Wolfram MathWorld, http://mathworld.wolfram.com/AffineTransformation.html, downloaded Feb. 21, 2014, 2 pages.
AlMangour et al., "Scanning strategies for texture and anisotropy tailoring during selective laser melting of TiC/316L stainless steel nanocomposites," Journal of Alloys and Compounds, 728:424-435 (Aug. 5, 2017).
Anastasiadi et al., "Fabrication and characterization of machined multi-core fiber tweezers for single cell manipulation," *Optics Express*, 26:3557-3567 (Feb. 5, 2018).
Applicant-Initiated Interview Summary from U.S. Appl. No. 15/607,399, dated May 25, 2018, 3 pages.
Applicant-Initiated Interview Summary from U.S. Appl. No. 15/607,399, dated Jul. 27, 2018, 9 pages.
Applicant-Initiated Interview Summary from U.S. Appl. No. 15/607,410, dated May 25, 2018, 3 pages.
Applicant-Initiated Interview Summary from U.S. Appl. No. 15/607,410, dated Jul. 24, 2018, 9 pages.
Applicant-Initiated Interview Summary from U.S. Appl. No. 15/607,411, dated Jan. 17, 2018, 2 pages.
Applicant-Initiated Interview Summary from U.S. Appl. No. 15/607,411, dated Sep. 12, 2018, 17 pages.
Ayoola, "Study of Fundamental Laser Material Interaction Parameters in Solid and Powder Melting," Ph.D. Thesis, Cranfield University, 192 pages (May 2016).
Barron et al., "Dual-beam interference from a lensed multicore fiber and its application to optical trapping," *Optics Express*, 20:23156-23161 (Oct. 8, 2012).
Barron et al., "Optical Trapping using a Lensed Multicore Fiber," Workshop on Specialty Optical Fibers and their Applications, OSA 2013, 2 pages (2013).
Bergmann et al., "Effects of diode laser superposition on pulsed laser welding of aluminum," *Physics Procedia*, 41:180-189 (2013).
Bertoli et al., "On the limitations of Volumetric Energy Density as a design parameter for Selective Laser Melting," Materials and Design, 113:331-340 (Oct. 19, 2016).
Burger et al., "Implementation of a spatial light modulator for intracavity beam shaping," J. Opt., 17:1-7, (2015).
Caprio, "Investigation of emission modes in the SLM of AISI 316L: modelling and process diagnosis," Ph.D. Thesis, Polytechnic University of Milan, 3 pages (Apr. 28, 2017).—Abstract only.
Chen et al., "An Algorithm for correction of Distortion of Laser marking Systems," IEEE International Conference on Control and Automation, Guangzhou, China, 5 pages (May 30-Jun. 1, 2007).
Chen et al., "Improving additive manufacturing processability of hard-to-process overhanging structure by selective laser melting," *Journal of Materials Processing Tech.*, 250:99-108 (Jul. 1, 2017).
Chung, "Solution-Processed Flexible Transparent Conductors Composed of Silver Nanowire Networks Embedded in Indium Tin Oxide Nanoparticle Matrices," Nano Research, 10 pages (Sep. 24, 2012).
Cloots et al., "Investigations on the microstructure and crack formation of IN738LC samples processed by selective laser melting using Gaussian and doughnut profiles," *Materials and Design*, 89:770-784 (2016).
Cui, et al., "Calibration of a laser galvanometric scanning system by adapting a camera model," *Applied Optics* 48(14):2632-2637 (Jun. 2009).
DebRoy et al., "Additive manufacturing of metallic components—Process, structure and properties," *Progress in Materials Science*, 92:112-224 (2018).

Dehoff et al., "Site specific control of crystallographic grain orientation through electron beam additive manufacturing," *Materials Science and Technology*, 31:931-938 (2015).
Demir et al., "From pulsed to continuous wave emission in SLM with contemporary fiber laser sources: effect of temporal and spatial pulse overlap in part quality," *Int. J. Adv. Manuf. Technol.*, 91:2701-2714 (Jan. 10, 2017).
Dezfoli et al., "Determination and controlling of grain structure of metals after laser incidence: Theoretical approach," *Scientific Reports*, 7:1-11 (Jan. 30, 2017).
Drobczynski et al., "Real-time force measurement in double wavelength optical tweezers," *Journal of the Optical Society of America B*, 34:38-43 (Jan. 2017).
Duocastella et al., "Bessel and annular beams for materials processing," *Laser Photonics Rev.* 6, pp. 607-621 (2012).
Faidel et al., "Improvement of selective laser melting by beam shaping and minimized thermally induced effects in optical systems," 9th International Conference on Photonic Technologies LANE 2016, pp. 1-4 (2016).
Fermann, "Single-mode excitation of multimode fibers with ultrashort pulses," Optics Letters, 23:52-54 (Jan. 1, 1998).
Fey, "3D Printing and International Security," PRIF Report No. 144, 47 pages (2017).
First Office Action from Chinese Application No. 201410455972.X, dated Jan. 26, 2016, 21 pages (with English translation).
First Office Action from Chinese Application No. 201480019324.8, dated Apr. 5, 2017, 20 pages (with English translation).
Florentin et al., "Shaping the light amplified in a multimode fiber," Official Journal of the CIOMP, Light: Science & Applications, 6:1-9 (Feb. 24, 2017).
Francis, "The Effects of Laser and Electron Beam Spot Size in Additive Manufacturing Processes," Ph.D. Thesis, Carnegie Mellon University, 191 pages (May 2017).
Fuchs et al., "Beam shaping concepts with aspheric surfaces," *Proc. of SPIE*, 9581:95810L-1-95810L-7 (Aug. 25, 2015).
Gardner, "Precision Photolithography on Flexible Substrates," http://azorescorp.com/downloads/Articles/AZORESFlexSubstrate.pdf (prior to Jan. 30, 2013).
Ghouse et al., "The influence of laser parameters and scanning strategies on the mechanical properties of a stochastic porous material," *Materials and Design*, 131:498-508 (2017).
Giannini et al., "Anticipating, measuring, and minimizing MEMS mirror scan error to improve laser scanning microscopy's speed and accuracy," PLOS ONE, 14 pages (Oct. 3, 2017).
Gissibl et al., "Sub-micrometre accurate free-form optics by three-dimensional printing on single-mode fibres," *Nature Communications*, 7:1-9 (Jun. 24, 2016).
Gockel et al., "Integrated melt pool and microstructure control for Ti—6Al—4V thin wall additive manufacturing," *Materials Science and Technology*, 31:912-916 (Nov. 3, 2014).
Grigoriyants et al., "Tekhnologicheskie protsessy lazernoy obrabotki," Moscow, izdatelstvo MGTU im. N.E. Baumana, p. 334 (2006).
Gunenthiram et al., "Analysis of laser-melt pool-powder bed interaction during the selective laser melting of a stainless steel," *Journal of Laser Applications*, 29:022303-1-022303-8 (May 2017).
Gupta, "A Review on Layer Formation Studies in Selective Laser Melting of Steel Powders and Thin Wall Parts Using Pulse Shaping," *International Journal of Manufacturing and Material Processing*, 3:9-15 (2017).
Hafner et al., "Tailored laser beam shaping for efficient and accurate microstructuring," *Applied Physics A*, 124:111-1-111-9 (Jan. 10, 2018).
Han et al., "Selective laser melting of advanced Al—$Al_2O_3$ nanocomposites: Simulation, microstructure and mechanical properties," *Materials Science & Engineering A*, 698:162-173, (May 17, 2017).
Hansen et al., "Beam shaping to control of weldpool size in width and depth," *Physics Procedia*, 56:467-476 (2014).
Hauschild, "Application Specific Beam Profiles—New Surface and Thin-Film Refinement Processes using Beam Shaping Technologies," *Proc. of SPIE*, 10085:100850J-1-100850J-9 (Feb. 22, 2017).

(56) References Cited

OTHER PUBLICATIONS

Hebert, "Viewpoint: metallurgical aspects of powder bed metal additive manufacturing," *J. Mater. Sci.*, 51:1165-1175 (Nov. 18, 2015).
Heck, "Highly integrated optical phased arrays: photonic integrated circuits for optical beam shaping and beam steering," *Nanophotonics*, 6:93-107 (2017).
Hengesbach et al., "Brightness and average power as driver for advancements in diode lasers and their applications," *Proc. SPIE*, 9348, 18 pages (2015).
Hester et al., "Tunable optical tweezers for wavelength-dependent measurements," *Review of Scientific Instruments*, 83:043114-1-043114-8 (2012).
Huang et al., "3D printing optical engine for controlling material microstructure," Physics Procedia, 83:847-853 (2016).
International Search Report and Written Opinion for International Application No. PCT/US2013/060470, 7 pages, dated Jan. 16, 2014.
International Search Report and Written Opinion for International Application No. PCT/US2014/017841, 5 pages, dated Jun. 5, 2014.
International Search Report and Written Opinion for International Application No. PCT/US2014/017836, 6 pages, dated Jun. 10, 2014.
International Search Report and Written Opinion for International Application No. PCT/US2016/063086, 6 pages, dated Mar. 23, 2017.
International Search Report and Written Opinion for International Application No. PCT/US2017/014182, 9 pages, dated Mar. 31, 2017.
International Search Report and Written Opinion for International Application No. PCT/US2018/024944, dated Jul. 12, 2018, 8 pages.
International Search Report and Written Opinion for International Application No. PCT/US2018/023944, dated Aug. 2, 2018, 7 pages.
International Search Report and Written Opinion for International Application No. PCT/US2018/026110, 12 pages, dated Aug. 8, 2018.
International Search Report and Written Opinion for International Application No. PCT/US2018/023963, dated Aug. 9, 2018, 7 pages.
International Search Report and Written Opinion for International Application No. PCT/US2018/024899, dated Aug. 9, 2018, 7 pages.
International Search Report and Written Opinion for International Application No. PCT/US2018/024955, dated Aug. 9, 2018, 8 pages.
International Search Report and Written Opinion for International Application No. PCT/US2018/024953, dated Aug. 16, 2018, 8 pages.
International Search Report and Written Opinion from International Application No. PCT/US2018/024227, dated Aug. 30, 2018, 7 pages.
International Search Report and Written Opinion from International Application No. PCT/US2018/024904, dated Aug. 30, 2018, 5 pages.
Java—Transform a triangle to another triangle—Stack Overflow, http://stackoverflow.com/questions/1114257/transform-a-triangle-to-another-triangle?lq=1, downloaded Feb. 21, 2014, 3 pages.
Ji et al., "Meta-q-plate for complex beam shaping," *Scientific Reports*, 6:1-7 (May 6, 2016).
Kaden et al., "Selective laser melting of copper using ultrashort laser pulses," Lasers in Manufacturing Conference 2017, pp. 1-5 (2017).
Kaden et al., "Selective laser melting of copper using ultrashort laser pulses," *Applied Physics A*, 123:596-1-596-6 (Aug. 24, 2017).
King et al., "Observation of keyhole-mode laser melting in laser powder-bed fusion additive manufacturing," *Journal of Materials Processing Technology*, 214:2915-2925 (2014).
Klerks et al., "Flexible beam shaping system for the next generation of process development in laser micromachining," 9th International Conference on Photonic Technologies LANE 2016, pp. 1-8 (2016).
Kummer et al., "Method to quantify accuracy of position feedback signals of a three-dimensional two-photon laser-scanning microscope," Biomedical Optics Express, 6(10):3678-3693 (Sep. 1, 2015).
Laskin et al., "Applying of refractive spatial beam shapers with scanning optics," ICALEO, Paper M604, pp. 941-947 (2011).
Lee et al., "FEM Simulations to Study the Effects of Laser Power and Scan Speed on Molten Pool Size in Additive Manufacturing," *International Journal of Mechanical and Mechatronics Engineering*, 11:1291-1295 (2017).
Li et al., "High-quality near-field beam achieved in a high-power laser based on SLM adaptive beam-shaping system," *Optics Express*, 23:681-689 (Jan. 12, 2015).
Li et al., "Melt-pool motion, temperature variation and dendritic morphology of Inconel 718 during pulsed-and continuous-wave laser additive manufacturing: A comparative study," *Materials and Design*, 119:351-360 (Jan. 23, 2017).
Litvin et al., "Beam shaping laser with controllable gain," *Appl. Phys. B*, 123:174-1-174-5 (May 24, 2017).
Liu et al., "Femtosecond laser additive manufacturing of YSZ," *Appl. Phys. A*, 123:293-1-293-8 (Apr. 1, 2017).
Ludtke, et al., "Calibration of Galvanometric Laser Scanners Using Statistical Learning Methods," Bildverabeitung für die Medizin, pp. 467-472 (Feb. 25, 2015).
Malinauskas et al., "Ultrafast laser processing of materials: from science to industry," *Official Journal of the CIOMP, Light: Science & Applications*, 5:1-14 (2016).
Manakov, et al., "A Mathematical Model and Calibration Procedure for Galvanometric Laser Scanning Systems," Vision, Modeling, and Visualization, 8 pages (Jan. 2011).
Masoomi et al., "Quality part production via multi-laser additive manufacturing," *Manufacturing Letters*, 13:15-20 (May 27, 2017).
Matthews et al., "Diode-based additive manufacturing of metals using an optically-addressable light valve," *Optics Express*, 25:11788-11800 (May 15, 2017).
Meier et al., "Thermophysical Phenomena in Metal Additive Manufacturing by Selective Laser Melting: Fundamentals, Modeling, Simulation and Experimentation," available at: http://arxiv.org/pdf/1709.09510v1, pp. 1-59 (Sep. 4, 2017).
Morales-Delgado et al., "Three-dimensional microfabrication through a multimode optical fiber," available at: http://arxiv.org, 20 pages (2016).
Morales-Delgado et al., "Three-dimensional microfabrication through a multimode optical fiber," *Optics Express*, 25:7031-7045 (Mar. 20, 2017).
Mumtaz et al., "Selective Laser Melting of thin wall parts using pulse shaping," Journal of Materials Processing Technology, 210:279-287 (2010).
Naidoo et al., "Improving the laser brightness of a commercial laser system," Proc. of SPIE, 10036:100360V-1-100360V-8 (Feb. 3, 2017).
Ngcobo et al., "A digital laser for on-demand laser modes," *Nature Communications*, 4:1-6 (Aug. 2, 2013).
Ngcobo et al., "The digital laser," available at: http://arxiv.org, pp. 1-9 (2013).
Notice of Preliminary Rejection from the Korean Intellectual Property Office for related Application No. 10-2015-7025813, dated Jun. 26, 2018, 18 pages (with English translation).
Office Action for related Chinese Application No. 201480022179.9, 5 pages, dated Mar. 30, 2017 (no English translation).
Office Action for related Korea Application No. 10-2014-0120247, dated Apr. 14, 2017, 11 pages (with English translation).
Office action from U.S. Appl. No. 15/074,838, dated May 19, 2017, 12 pages.
Office Action for related Chinese Application No. 201380075745.8, 21 pages, dated Jun. 2, 2017 (with English translation).
Office Action for related Korea Application No. 10-2014-0120247, dated Oct. 18, 2017, 6 pages (with English translation).
Office action from U.S. Appl. No. 15/607,399, dated Sep. 14, 2018, 19 pages.
Office action from U.S. Appl. No. 15/938,959, dated Jul. 18, 2018, 6 pages.
Office action from U.S. Appl. No. 15/939,064, dated Jul. 27, 2018, 7 pages.
Office action from U.S. Appl. No. 15/939,064, dated Oct. 5, 2018, 22 pages.

(56) References Cited

OTHER PUBLICATIONS

Office action from U.S. Appl. No. 15/938,959, dated Oct. 5, 2018, 22 pages.
Official Action for related Taiwan application No. 103130968 dated Jun. 7, 2017, 5 pages (with English translation).
Official Letter and Search Report from the Taiwan Intellectual Property Office for related Application No. 103106020, 21 pages, dated Apr. 20, 2016 (with English translation).
Official Letter and Search Report from the Taiwan Intellectual Property Office for related Application No. 102139285, 21 pages, dated Jun. 13, 2016 (with English translation.).
Official Letter and Search Report from the Taiwan Intellectual Property Office for related Application No. 102139285, 8 pages, dated Nov. 21, 2016 (with English translation).
Official Letter and Search Report from Taiwan Application No. 103130968, dated Dec. 20, 2016, 16 pages (with English translation).
Official Letter and Search Report from Taiwan Application No. 103106020, dated Jun. 6, 2017, 7 pages (with English translation).
Okunkova et al., "Development of laser beam modulation assets for the process productivity improvement of selective laser melting," *Procedia IUTAM*, 23:177-186 (2017).
Okunkova et al., "Experimental approbation of selective laser melting of powders by the use of non-Gaussian power density distributions," *Physics Procedia*, 56:48-57 (2014). (2017).
Okunkova et al., "Study of laser beam modulation influence on structure of materials produced by additive manufacturing," *Adv. Mater. Lett.*, 7:111-115 (2016).
Olsen, "Laser metal cutting with tailored beam patterns," available at: https://www.industrial-lasers.com/articles/print/volume-26/issue-5/features/laser-metal-cutting-with-tailored-beam-patterns.html, 8 pages (Sep. 1, 2011).
"Optical Tweezers & Micromanipulation: Applications Hamamatsu Photonics," available at: http://www.hamamatsu.com/jp/en/community/lcos/aplications/optical.html, archived: Mar. 27, 2015, 3 pages.
PCI-6110, Multifunction I/O Device, http.//www.ni.com/en-us-support/model.pci-6110.html, downloaded Dec. 15, 2017, 1 page.
Pinkerton, "Lasers in Additive Manufacturing," *Optics & Laser Technology*, 78:25-32 (2016).
Prashanth et al., "Is the energy density a reliable parameter for materials synthesis by selective laser melting?" *Mater. Res. Lett.*, 5:386-390 (2017).
Product Brochure entitled "3-Axis and High Power Scanning" by Cambridge Technology, 4 pages, downloaded Dec. 21, 2013.
Product Brochure supplement entitled "Theory of Operation" by Cambridge Technology, 2 pages, downloaded Dec. 21, 2013.
Putsch et al., "Active optical system for advanced 3D surface structuring by laser remelting," *Proc. of SPIE*, 9356:93560U-1-93560U-10 (Mar. 9, 2015).
Putsch et al., "Active optical system for laser structuring of 3D surfaces by remelting," *Proc. of SPIE*, 8843:88430D-1-88430D-8 (Sep. 28, 2013).
Putsch et al., "Integrated optical design for highly dynamic laser beam shaping with membrane deformable mirrors," *Proc. of SPIE*, 10090:1009010-1-1009010-8 (Feb. 20, 2017).
Raghavan et al., "Localized melt-scan strategy for site specific control of grain size and primary dendrite arm spacing in electron beam additive manufacturing," *Acta Materialia*, 140:375-387 (Aug. 30, 2017).
Rashid et al., "Effect of scan strategy on density and metallurgical properties of 17-4PH parts printed by Selective Laser Melting (SLM)," *Journal of Materials Processing Tech.*, 249:502-511 (Jun. 19, 2017).
Roehling et al., "Modulating laser intensity profile ellipticity for microstructural control during metal additive manufacturing," Acta Materialia, 128:197-206 (2017).
Rosales-Guzman et al., "Multiplexing 200 modes on a single digital hologram," available at: http://arxiv.org/pdf/1706.06129v1, pp. 1-14 (Jun. 19, 2017).

Saint-Pierre et al., "Fast uniform micro structuring of DLC surfaces using multiple ultrashort laser spots through spatial beam shaping," Physics Procedia, 83:1178-1183 (2016).
Sames et al., "The metallurgy and processing science of metal additive manufacturing," International Materials Reviews, pp. 1-46 (2016).
Schulze et al., "Mode Coupling in Few-Mode Fibers Induced by Mechanical Stress," *Journal of Lightwave Technology*, 33:4488-4496 (Nov. 1, 2015).
Search Report from the Taiwan Intellectual Property Office for related Application No. 102139285, 21 pages, dated Sep. 1, 2015 (with English translation).
Search Report from the Taiwan Intellectual Property Office for related Application No. 102139285, 9 pages, dated Sep. 4, 2017 (with English translation).
Second Office Action from Chinese Application No. 201410455972.X, dated Nov. 22, 2016, 22 pages (with English translation).
Second Office Action from Chinese Application No. 201480019324.8, dated Nov. 16, 2017, 21 pages (with English translation).
Second Office Action from Chinese Application No. 201380075745.8, dated Feb. 26, 2018, 6 pages (with English translation).
Shusteff et al., "One-step volumetric additive manufacturing of complex polymer structures," *Sci. Adv.*, 3:1-7 (Dec. 8, 2017).
Third Office Action from Chinese Application No. 201480019324.8, dated Apr. 13, 2018, 8 pages (with English translation).
Yan et al., "Formation mechanism and process optimization of nano $Al_2O_3$—$ZrO_2$ eutectic ceramic via laser engineered net shaping (LENS)," *Ceramics International*, 43:1-6 (2017).
Argyros et al., "Bend loss in highly multimode fibres," Optics Express, 16:18590-18598 (Nov. 10, 2008).
Andreasch et al., "Two concentric fiber diameters in one laser light cable," Optical Components, No. 1, pp. 38-41 (Jan. 2011).
Applicant-Initiated Interview Summary from U.S. Appl. No. 15/607,399, dated Dec. 26, 2018, 7 pages.
Bai et al., "Effect of Bimodal Powder Mixture on Powder Packing Density and Sintered Density in Binder Jetting of Metals," 26th Annual International Solid Freeform Fabrication Symposium, 14 pages (Aug. 10-12, 2015).
Balazic, "Additive Manufacturing and 3D Printing Lens Technology," Additive Manufacturing of Metal Components Conference at IK4-Lortek, 52 pages (Nov. 27, 2013).
"Bending Machine," CBC Alta Technologia Italiana, General Catalog, pp. 96-97 (2011).
Brown et al., "Fundamentals of Laser-Material Interaction and Application to Multiscale Surface Modification," Chapter 4, Laser Precision Microfabrication, pp. 91-120 (2010).
Decision of Rejection from the Korean Intellectual Property Office for related Application No. 10-2015-7025813, 6 pages, dated Nov. 29, 2018.
Decombe et al., "Single and dual fiber nano-tip optical tweezers: trapping and analysis," Optics Express, 21:30521-30531 (Dec. 4, 2013).
Deng et al., "Annular arrayed-waveguide fiber for autofocusing Airy-like beams," Optics Letters, 41:824-827 (Feb. 15, 2016).
"Enhanced Lens Thermal Imaging Capabilities Introduced by Optomec," Optomec, 4 pages (Jan. 8, 2013).
European Search Report for related Application No. 18173438.5, 3 pages, dated Oct. 5, 2018.
Examiner-Initiated Interview Summary U.S. Appl. No. 15/607,410, dated Jan. 31, 2019, 2 pages.
Extended European Search Report for related Application No. 18173438.5, 3 pages, dated Oct. 15, 2018.
Farley et al., "Optical fiber designs for beam shaping," Proc. of SPIE, Fiber Lasers XI: Technology, Systems, and Applications, 8961:89612U-1-89612U-10 (2014).
Fini, "Bend distortion in large-mode-area amplifier fiber design," Proc. of SPIE, 6781:67810E-1-67810E-11 (Nov. 21, 2007).
First Office Action for related Chinese Application No. 201510295923.9, dated Nov. 21, 2018, 6 pages (with English translation).
First Office Action for related Chinese Application No. 201510468218.4, dated Dec. 4, 2018, 14 pages (with English translation).
First Office Action for related Chinese Application No. 201680068424.9, dated Jan. 29, 2019, 10 pages (with English translation).

(56) References Cited

OTHER PUBLICATIONS

First Office Action for related Chinese Application No. 201680043132. X, dated May 21, 2019, 21 pages (with English translation).
Gris-Sanchez et al., "The Airy fiber: an optical fiber that guides light diffracted by a circular aperture," Optica, 3:270-276 (Mar. 2016).
International Preliminary Report on Patentability from International Application No. PCT/US2017/034848, dated Apr. 2, 2019, 9 pages.
International Search Report and Written Opinion from International Application No. PCT/US2018/015768, dated Jun. 11, 2018, 15 pages.
International Search Report and Written Opinion from International Application No. PCT/US2018/016305, dated Jun. 11, 2018, 10 pages.
International Search Report and Written Opinion from International Application No. PCT/US2018/016288, dated Jun. 11, 2018, 10 pages.
International Search Report and Written Opinion from International Application No. PCT/US2018/024145, dated Jun. 21, 2018, 5 pages.
International Search Report and Written Opinion from International Application No. PCT/US2018/015710, dated Jun. 25, 2018, 17 pages.
International Search Report and Written Opinion from International Application No. PCT/US2018/024548, dated Jun. 28, 2018, 6 pages.
International Search Report and Written Opinion for International Application No. PCT/US2018/015895, dated Jul. 10, 2018, 10 pages.
International Search Report and Written Opinion from International Application No. PCT/US2018/024510, dated Jul. 12, 2018, 6 pages.
International Search Report and Written Opinion from International Application No. PCT/US2018/024974, dated Jul. 12, 2018, 6 pages.
International Search Report and Written Opinion from International Application No. PCT/US2018/022629, dated Jul. 26, 2018, 11 pages.
International Search Report and Written Opinion from International Application No. PCT/US2018/023012, dated Aug. 9, 2018, 7 pages.
International Search Report and Written Opinion from International Application No. PCT/US2018/024954, dated Aug. 23, 2018, 7 pages.
International Search Report and Written Opinion from International Application No. PCT/US2018/024958, dated Aug. 23, 2018, 6 pages.
International Search Report and Written Opinion from International Application No. PCT/US2018/024971, dated Aug. 30, 2018, 8 pages.
International Search Report and Written Opinion from International Application No. PCT/US2018/024907, dated Sep. 27, 2018, 6 pages.
Jacobs, "Suggested Guidelines for the Handling of Optical Fiber," White Paper, Corning Incorporated, pp. 1-8 (Dec. 2001).
Jollivet, "Specialty Fiber Lasers and Novel Fiber Devices," Doctoral Dissertation, Univeristy of Central Florida, 213 pages (2014).
Jollivet et al., "Advances in Multi-Core Fiber Lasers," *Latin America Optics and Photonics Conference*, OSA Technical, 4 pages (Nov. 2014).
Keicher et al., "Advanced 3D Printing of Metals and Electronics using Computational Fluid Dynamics," Solid Freeform Fabrication Symposium, 32 pages (Aug. 2015).
Khairallah et al, "Laser power-bed fusion additive manufacturing: Effects of main physical processes on dynamical melt flow and pore formation from mesoscopic powder simulation," Lawrence Livermore National Laboratory, 26 pages (Aug. 20, 2015).
Khijwania et al., "Propagation characteristics of single-mode graded-index elliptical core linear and nonlinear fiber using super-Gaussian approximation," *Applied Optics*, 48:G156-G162 (Nov. 1, 2009).
Kosolapov et al., "Hollow-core revolver fibre with a double-capillary reflective cladding," Quantum Electronics, 46:267-270 (2016).
Krupa et al., "Spatial beam self-cleaning in multimode fiber," available at: https://arxiv.org/abs/1603.02972v1, 8 pages (Mar. 9, 2016).
Kruth et al., "On-line monitoring and process control in selective laser melting and laser cutting," *Proceedings of the 5th Lane Conference, laser Assisted Net Shape Engineering*, vol. 1, 14 pages, (Sep. 1, 2007).
Laskin et al., "Beam shaping to generate uniform "Laser Light Sheet" and Linear Laser Spots," Proc. of SPIE, The International Society for Optical Engineering, 13 pages (Sep. 2013).
Lee et al., "Use of the Coaxial-Core Profile in the Erbium-Doped Fiber Amplifier for Self-Regulation of Gain Spectrum," IEICE Trans. Commun., E82-B:1273-1282 (Aug. 1999).
Messerly et al., "Field-flattened, ring-like propagation modes," *Optics Express*, 21:12683-12698 (May 16, 2013).
Messerly et al., "Patterned flattened modes," *Optics Letters*, 38:3329-3332 (Sep. 1, 2013).
Neilson et al., "Free-space optical relay for the interconnection of multimode fibers," *Applied Optics*, 38:2291-2296 (Apr. 10, 1999).
Neilson et al., "Plastic modules for free-space optical interconnects," *Applied Optics*, 37:2944-2952 (May 10, 1998).
Notice of Allowance and Examiner-Initiated Interview Summary from U.S. Appl. No. 15/607,411, dated Jan. 7, 2019, 14 pages.
Notice of Allowance from U.S. Appl. No. 15/607,399, dated Jun. 4, 2019, 15 pages.
Notice of Reasons for Rejection for JP Application No. 2018-527718, 15 pages, dated Dec. 13, 2018 (with English translation).
Office action and Applicant-Initiated Interview Summary from U.S. Appl. No. 15/607,410, dated Dec. 31, 2018, 63 pages.
Office action from U.S. Appl. No. 15/607,399, dated Jan. 11, 2019, 63 pages.
Office action from U.S. Appl. No. 14/768,595, dated Mar. 8, 2019, 8 pages.
Office action from U.S. Appl. No. 15/938,959, dated Apr. 18, 2019, 57 pages.
Office action from U.S. Appl. No. 15/939,064, dated Apr. 18, 2019, 52 pages.
Office Action for related Chinese Application No. 201610182805.1, 20 pages, dated Jan. 3, 2019 (with English translation).
Office Action for European Application No. EP 17741945.4, 7 pages, dated Jan. 9, 2019.
Official Letter and Search Report from Taiwan Application No. 106133704, dated Mar. 13, 2019, 29 pages (with English translation).
Salceda-Delgado et al., "Compact fiber-optic curvature sensor based on super-mode interference in a seven-core fiber," Optics Letters, 40:1468-1471 (Apr. 1, 2015).
Sateesh et al., "Effect of Process Parameters on Surface Roughness of Laser Processed Inconel Superalloy," International Journal of Scientific & Engineering Research, 5:232-236 (Aug. 2014).
Skutnik et al., "Optical Fibers for Improved Low Loss Coupling of Optical Components," *Proc. of SPIE, Photon Processing in Micro-electronics and Photnics III*, 6 pages (Jul. 15, 2004).
Smith et al., "Tailoring the thermal conductivity of the powder bed in Electron Beam Melting (EBM) Additive Manufacturing," *Scientific Reports*, 7:1-8 (Sep. 5, 2017).
Spears et al., "In-process sensing in selective laser melting (SLM) additive manufacturing," *Integrating Materials and Manufacturing Innovation*, 5:2-25 (2016).
Sundqvist et al., "Analytical heat conduction modelling for shaped laser beams," *Journal of Materials Processing Tech.*, 247:48-54 (Apr. 18, 2017).
Supplementary European Search Report for Application No. EP 17741945.4, 18 pages, dated Nov. 16, 2018.
Thiel et al., "Reliable Beam Positioning for Metal-based Additive Manufacturing by Means of Focal Shift Reduction," Lasers in Manufacturing Conference 2015, 8 pages. (2015).
Tofail et al., "Additive manufacturing: scientific and technological challenges, market uptake and opportunities," Materials Today, pp. 1-16 (2017).
Trapp et al., "In situ absorptivity measurements of metallic powders during laser powder-bed fusion additive manufacturing," Applied Materials Today, 9:341-349 (2017).

(56) References Cited

OTHER PUBLICATIONS

Ulmanen, "The Effect of High Power Adjustable Ring Mode Fiber Laser for Material Cutting," M.S. Thesis, Tampere University of Technology, 114 pages (May 2017).
"UNI 42 A," Curvatubi elettrica digitale, 5 pages (2016).
"UNI 60 COMBI 2," Frame-Grab of YouTube Video, 1 page (Sep. 26, 2011).
Valdez et al., "Induced porosity in Super Alloy 718 through the laser additive manufacturing process: Microstructure and mechanical properties," *Journal of Alloys and Compounds*, 725:757-764 (Jul. 22, 2017).
Villatoro et al., "Ultrasensitive vector bending sensor based on multicore optical fiber," *Optics Letters*, 41:832-835 (Feb. 15, 2016).
Wang et al., "Mechanisms and characteristics of spatter generation in SLM processing and its effect on the properties," *Materials & Design*, 117(5):121-130 (Mar. 5, 2017).
Wang et al., "Selective laser melting of W—Ni—Cu composite powder: Densification, microstructure evolution and nano-crystalline formation," *International Journal of Refractory Metals & Hard Materials*, 70:9-18 (Sep. 9, 2017).
Website describing 3-Axis Laser Scanning Systems at http://www.camtech.com/index.php?option=com_content&view=article&id=131&Itemid=181, 4 pages, accessed Dec. 31, 2014.
Wilson-Heid et al., "Quantitative relationship between anisotropic strain to failure and grain morphology in additively manufactured Ti—6Al—4V," *Materials Science & Engineering A*, 706:287-294 (Sep. 6, 2017).
Wischeropp et al., "Simulation of the effect of different laser beam intensity profiles on heat distribution in selective laser melting," Laser in Manufacturing Conference 2015, 10 pages (2015).
Xiao et al., "Effects of laser modes on Nb segregation and Laves phase formation during laser additive manufacturing of nickel-based superalloy," *Materials Letters*, 188:260-262 (Nov. 1, 2016).
Xie et al., "Correction of the image distortion for laser galvanometric scanning system," *Optics & Laser Technology*, 37:305-311 (Jun. 2005).
Xu et al, "The Influence of Exposure Time on Energy Consumption and Mechanical Properties of SLM-fabricated Parts," 2017 Annual International Solid Freeform Fabrication Symposium, 7 pages (2017)—Abstract only.
Yan et al., "Formation mechanism and process optimization of nano $Al_2O_3$—$ZrO_2$ eutectic ceramic via laser engineered net shaping (LENS)," *Ceramics International*, 43:1-6 (2017).
Ye et al., "Mold-free fs laser shock micro forming and its plastic deformation mechanism," *Optics and Lasers in Engineering*, 67:74-82 (2015).
Yu, "Laser Diode Beam Spatial Combining," Ph.D. Thesis, Politecnico di Torino, 106 pages (Jun. 6, 2017).
Yu et al., "Development of a 300 W 105/0.15 fiber pigtailed diode module for additive manufacturing applications," Proc. of SPIE, 10086:100860A-1-100860A-5 (Feb. 22, 2017).
Yu et al., "Laser material processing based on non-conventional beam focusing strategies," 9th International Conference on Photonic Technologies LANE 2016, pp. 1-10 (2016).
Yusuf et al., "Influence of energy density on metallurgy and properties in metal additive manufacturing," *Materials Science and Technology*, 33:1269-1289 (Feb. 15, 2017).
Zavala-Arredondo et al., "Diode area melting single-layer parametric analysis of 316L stainless steel powder," *Int. J. Adv. Manuf. Technol.*, 94:2563-2576 (Sep. 14, 2017).
Zavala-Arredondo et al., "Laser diode area melting for high speed additive manufacturing of metallic components," *Materials and Design*, 117:305-315 (Jan. 3, 2017).
Zheng et al., "Bending losses of trench-assisted few-mode optical fibers," *Applied Optics*, 55:2639-2648 (Apr. 1, 2016).
Zhirnov et al., "Laser beam profiling: experimental study of its influence on single-track formation by selective laser melting," *Mechanics & Industry*, 16:709-1-709-6 (2015).
Zhu et al., "Effect of processing parameters on microstructure of laser solid forming Inconel 718 superalloy," *Optics and Laser Technology*, 98:409-415 (Sep. 5, 2017).
Zhu et al., "Gaussian beam shaping based on multimode interference," *Proc. of SPIE, Laser Resonators and Beam Control XII*, 7579:75790M-1-75790M-11 (2010).
Zou et al., "Adaptive laser shock micro-forming for MEMS device applications," *Optics Express*, 25:3875-3883 (Feb. 20, 2017).

\* cited by examiner

FIBER WITH DEPRESSED CENTRAL INDEX FOR INCREASED BEAM PARAMETER PRODUCT

CROSS-REFERENCE TO RELATED APPLICATIONS

This is the U.S. National Stage of International Application No. PCT/US2016/041526, filed Jul. 8, 2016, which was published in English under PCT Article 21(2), which in turn claims the benefit of U.S. Provisional Application No. 62/190,047, filed Jul. 8, 2015. The provisional application is incorporated herein in its entirety.

FIELD

The field pertains to optical fibers in laser systems.

BACKGROUND

In many laser system applications, superior laser performance often requires superior laser beam quality. Although a Gaussian beam profile corresponding to a highest achievable beam quality is often desired, many applications in laser machining and materials processing can benefit from beam profiles with other shapes. In addition, various steps of the laser process supply chain can benefit from having predictable beam quality. While methods for maximizing laser beam quality have received much attention, methods for manufacturing lasers with a specific reduced beam quality are lacking. Therefore, a need remains for solutions to overcome these drawbacks.

SUMMARY

According to one aspect, a method includes generating a multimode laser beam having an initial beam parameter product, and directing the multimode laser beam to an input end of a fiber so as to produce an output beam at an output of the fiber with a final beam parameter product that is greater than the initial beam parameter product.

According to another aspect, an apparatus includes a laser source situated to generate a laser beam having an associated beam parameter product, an output fiber optically coupled to the laser source and having a refractive index defining an output fiber core diameter and situated to receive the laser beam from the laser source, and a beam parameter product increasing fiber having a core diameter equal to the output fiber core diameter and optically coupled to the output fiber so as to receive the laser beam from the output fiber and to increase the beam parameter product of the laser beam to a selected value.

According to a further aspect, a method includes measuring a base beam parameter product associated with a multimode laser beam generated from a laser source and emitted from an output fiber output end, determining a beam parameter product increase for the multimode laser beam, and selecting a beam parameter product increasing optical fiber having an input end and an output end so that the multimode laser beam with the base beam parameter product coupled to the input end has an output beam parameter product at the output end of the beam parameter product increasing optical fiber corresponding to the determined beam parameter product increase.

In some examples, multimode fibers comprise a central core and an outer core situated about the central core, wherein a refractive index associated with the outer core is greater than a refractive index of the central core. A cladding is situated about the central core, wherein the cladding has a refractive index that is less than the refractive index and less than the refractive index associated with the central core. In some examples, the inner core defines a few mode core. In other examples, the outer core includes portions associated with at least a first refractive index and a second refractive index, wherein one or both of the first refractive index and the second refractive index are greater than the refractive index of the core.

The foregoing and other objects, features, and advantages of the disclosed technology will become more apparent from the following detailed description, which proceeds with reference to the accompanying figures.

DETAILED DESCRIPTION

Figure 1:
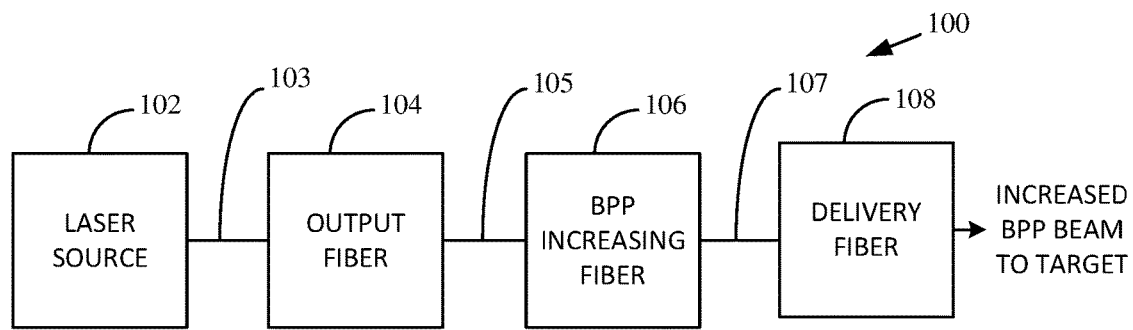
FIG. 1 is a schematic of a representative laser apparatus.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding or inner core/outer core refractive index difference, and a cladding NA is associated with an inner cladding/outer cladding refractive index difference. For an optical fiber having a core refractive index $n_{core}$ and a cladding index $n_{clad}$, a fiber core NA is $NA=\sqrt{n_{core}^2-n_{clad}^2}$.
For an optical fiber with an inner core and an outer core adjacent the inner core, a cladding NA is $NA=\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used. Some examples include fibers that support a few modes, and can be referred to as "few mode" fibers. Such fibers have a normalized frequency parameter (V-number) defined as $V=2 \cdot \pi \cdot a \cdot NA/\lambda$, wherein $\lambda$ is vacuum wavelength, 'a' is a fiber core radius, and NA is numerical aperture. For large V-number, a total number 't' of modes 'M' supported by a fiber is approximately $M=4 \cdot V^2/\pi^2+2$. For single-mode fibers, V is less than about 2.405. As used herein, a few mode fiber is defined as a fiber for which a V-number is less than about 5, 10, or 20.

In some examples disclosed herein, a waveguide core such as an optical fiber core can be doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam. In further examples, a waveguide core can be doped with one or more passive dopants, such as Ge, P, Al, F, and B so as to increase, decrease, or maintain a refractive index.

A laser beam parameter product (bpp) is generally equal to the product of the radius of the laser beam waist and the half angle of the laser beam's divergence. The ratio of a bpp of a laser beam to the bpp of a corresponding ideal Gaussian beam provides an $M^2$ beam quality value for comparing different beams. Exemplary laser beams typically contain multiple transverse optical modes. Such multimode (or few mode) beams typically have $M^2$ values greater than about 2, whereas single-mode beams typically have $M^2$ values less than about 2. In some examples, the single-mode beams and multimode beams have $M^2$ value of less than or greater than about 1.8, 1.6, 1.5, 1.4, or lower, respectively. In typical examples, a multimode beam has at least a significant portion of the power content of the multimode beam in one or more transverse optical modes higher than a fundamental $LP_{01}$ mode. Beam radii are often measured from a center to position where the beam has a $1/e^2$ value of the peak intensity of the beam, though other normalizing or averaging options may be used. Divergence angles are typically determined in the far field, such as several Rayleigh lengths from a beam focus.

Referring to FIG. 1, a laser apparatus 100 includes a laser source 102, an output fiber 104, a beam parameter product increasing optical fiber 106, and a delivery fiber 108. The laser source 102 generates a laser beam 103 that is coupled into the output fiber 104 so as to provide an output beam 105 at an output end of the output fiber 104 with a particular base beam parameter product (bpp) or within a particular beam parameter product range. The output beam 105 from the output fiber 104 is coupled to an input end of the bpp increasing optical fiber 106. The output beam 105 propagates through the bpp increasing optical fiber 106 and is provided with a final bpp at an output end of the bpp increasing optical fiber 106 that is larger than the base bpp at the output end of the output fiber 104, so as to form an increased bpp output beam 107. The increased bpp output beam 107 is coupled into the delivery fiber 108 and the delivery fiber 108 is situated to deliver the increased bpp output beam 107 to a target. In one example, the output beam has an $M^2$ of 1.07. The corresponding base bpp at an operating wavelength of about 1080 nm is about 0.37 mm·mrad. After propagation through the bpp increasing optical fiber 106, the increased bpp output beam 107 has a final bpp of about 0.49 mm·mrad.

In representative examples, the output fiber 104 is a step index fiber and the bpp increasing optical fiber 106 is a passive depressed central index fiber that includes a central core region with a selected refractive index and at least one outer core region surrounding the central core region with a selected refractive index higher than that of the central core region. Typically, the diameter of a core of the output fiber 104 is substantially equal to the core diameters of the bpp increasing optical fiber 106 and the delivery fiber 108. An input end of the bpp increasing optical fiber 106 is spliced to an output end of the output fiber 104 and an output end of the bpp increasing optical fiber 106 is spliced to an input end of the delivery fiber 108. Typical splicing methods include fusion splicing or fiber termination. In typical examples, a coupling loss associated with propagating a beam through splices at the input and output ends of the bpp increasing optical fiber 106 is less than about 5%, 2%, 1%, 0.5%, or 0.1%. The propagation of the output beam 105 through the bpp increasing optical fiber 106 provides the increased bpp output beam 107 with, for example, a selected annular or ring-shaped transverse intensity profile when directed to or focused at a target. In some examples, the transverse intensity profile includes a steep intensity decrease at a circumferential edge of the increased bpp output beam 107. Example slopes include a decrease corresponding to 90% of a maximum beam intensity $I_{MAX}$ over 5% of a beam radius R, a decrease of 80% over 10% of a beam radius, or a 60% decrease over 20% of a beam radius, though other slopes are possible. Such intensity decreases can provide advantageous results, such as a smoother cut surface, in high power laser materials processing, such as metal cutting. In further examples, the bpp increasing optical fiber 106 can be the same fiber as the delivery fiber 108.

Figure 2:
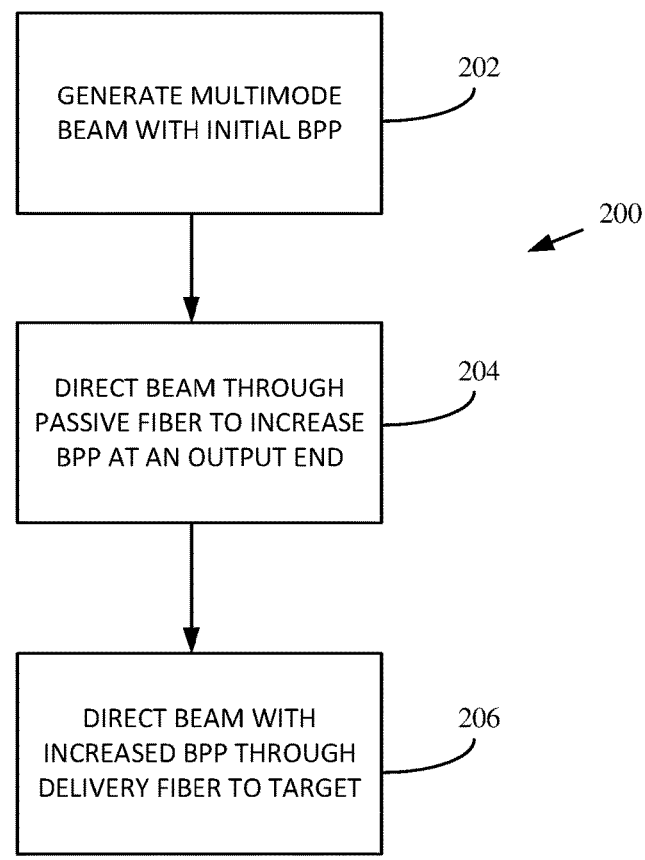
FIG. 2 is a flowchart of a representative method of increasing beam parameter product (bpp) of a multimode laser beam.

In FIG. 2, a method 200 includes, at 202, generating a multimode beam having an initial bpp and, at 204, directing the multimode beam to an input end of an optical fiber situated to produce a multimode output beam at an output of the optical fiber that has a final bpp that is greater than the initial bpp. The optical fiber generally increases the corresponding initial bpp to the final bpp through propagation of the beam through the optical fiber. In representative examples, the multimode output beam is passively propagated through the optical fiber. Fiber length can be varied so as to adjust the corresponding bpp increase. Fiber refractive index can be varied so as to also adjust the corresponding bpp increase. Suitable refractive index profiles for increasing bpp include profiles that include a central region having a lower refractive index relative to an adjacent side region. The final bpp associated with propagation through the optical fiber can be selected relative to the initial bpp so that the final bpp is within a bpp tolerance of the selected value of about ±25%, ±10%, ±5%, ±2%, ±1%, or lower. At 206, the multimode output beam with increased bpp is directed to a delivery fiber so that the multimode output beam can be delivered to a target. In typical examples, the multimode output beam has an average optical power of 1-100 kW, and the propagation that increases the bpp of the multimode output beam also reshapes a transverse intensity profile so that the multimode output beam includes side regions that diminish in intensity more rapidly than a beam having a Gaussian profile.

Figure 3:
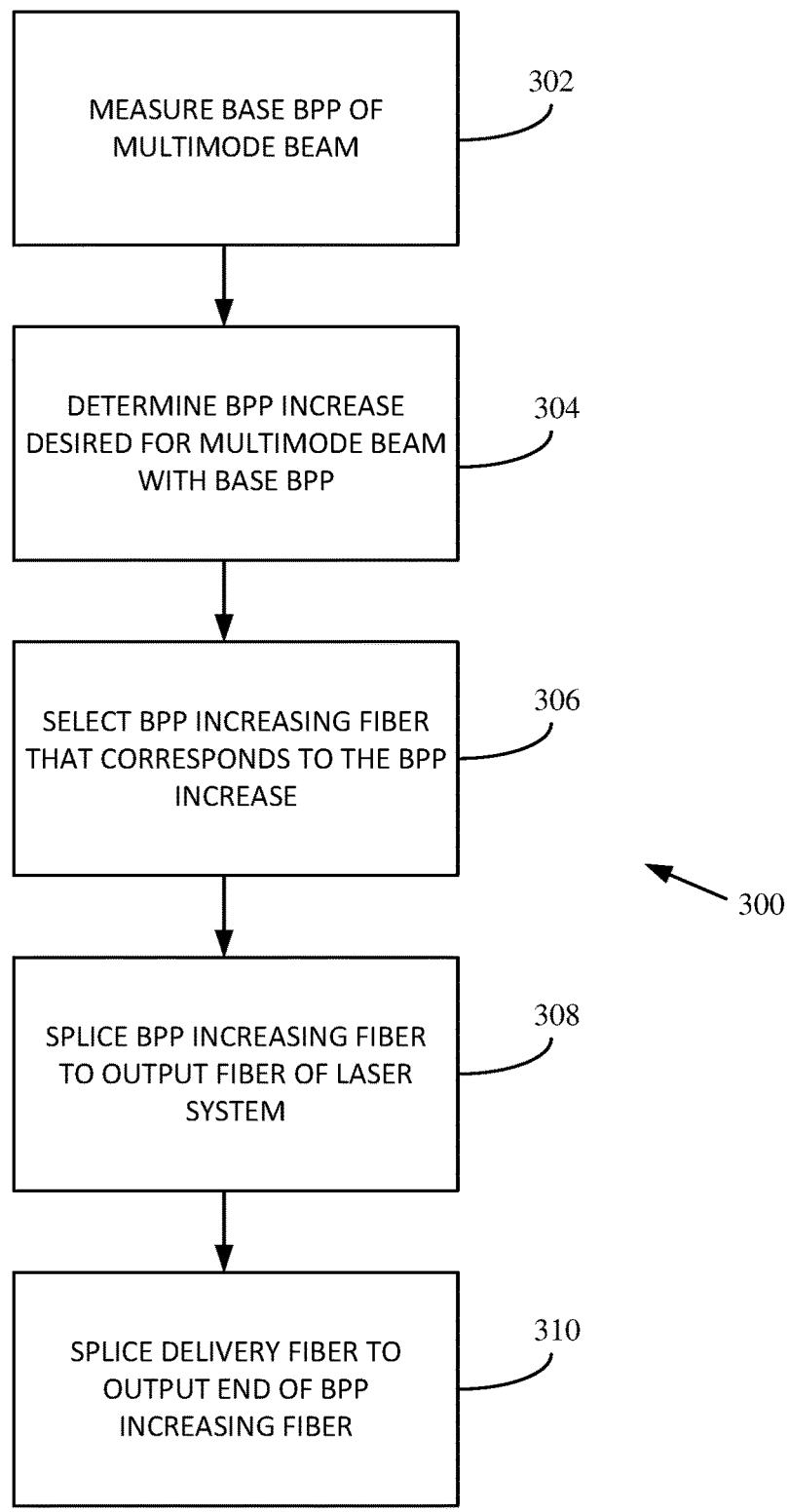
FIG. 3 is a flowchart of a representative method of increasing a multimode laser beam bpp to a selected bpp or bpp range.

Referring to FIG. 3, a method 300 includes, at 302, measuring a base bpp associated with a multimode laser beam that is generated from a corresponding laser source. The base bpp can be measured by situating an optical power measurement or detection instrument, such as a beam profiler, in the path of the multimode laser emitted from an output end of an output fiber associated with the laser source. At 304, an increase in bpp from the base bpp to a final bpp is determined for the multimode laser beam. At 306, a bpp increasing fiber is selected that provides the corresponding final bpp for the multimode laser beam at an output end of the bpp increasing fiber based on the measured base bpp. In some examples, a plurality of bpp increasing fiber bins can include separate bpp increasing fibers corresponding to particular bpp increases. Based on the measured bpp difference and/or the base and final bpps, as well as other fiber or system specifications (e.g., core diameter, system power), a suitable bpp increasing fiber may be selected from the plurality of bins. Bpp increasing fibers may also be selected with respect to suitable beam intensity profile at or near a beam focus. For example, a determined bpp increase may be achieved by selecting one of a plurality of different bpp increasing fibers, each providing a different selected beam intensity profile for the corresponding multimode laser beam directed through the bpp increasing fiber.

At 308, the selected bpp increasing fiber is spliced at an input end to the output end of the output fiber emitting the multimode laser beam. At 310, an output end of the bpp increasing fiber is spliced to an input end of a delivery fiber. In representative examples, core diameters of the output fiber, bpp increasing fiber, and delivery fiber are equal and a combined splice loss associated with the multimode laser beam propagating through fusion splices optically coupling the bpp increasing fiber to the output fiber and to the delivery fiber is less than about 5%, 2%, 1%, 0.1%, or lower. The bpp increasing fiber and the delivery fiber can be situated to direct the multimode laser beam with increased bpp to a target or to coupling optics that direct the multimode laser beam to the target. Though the bpp increasing fiber and the delivery fiber can be bent or coiled, in typical laser apparatus examples, the multimode laser beam is directed to the target without substantial bends. Articulation of the bpp increasing fiber and the delivery fiber in a laser head mounted to a gantry or scanning apparatus typically does not involve substantial bending. Thus, for bpp increasing fibers that produce selected transverse intensity profiles, optical loss associated with such bending is generally avoided. Such loss avoidance allows practical use of such bpp increasing fibers and also allows for the selection of transverse intensity profiles without the need for additional optics to modify the transverse intensity profile of multimode laser beams.

Figure 4:
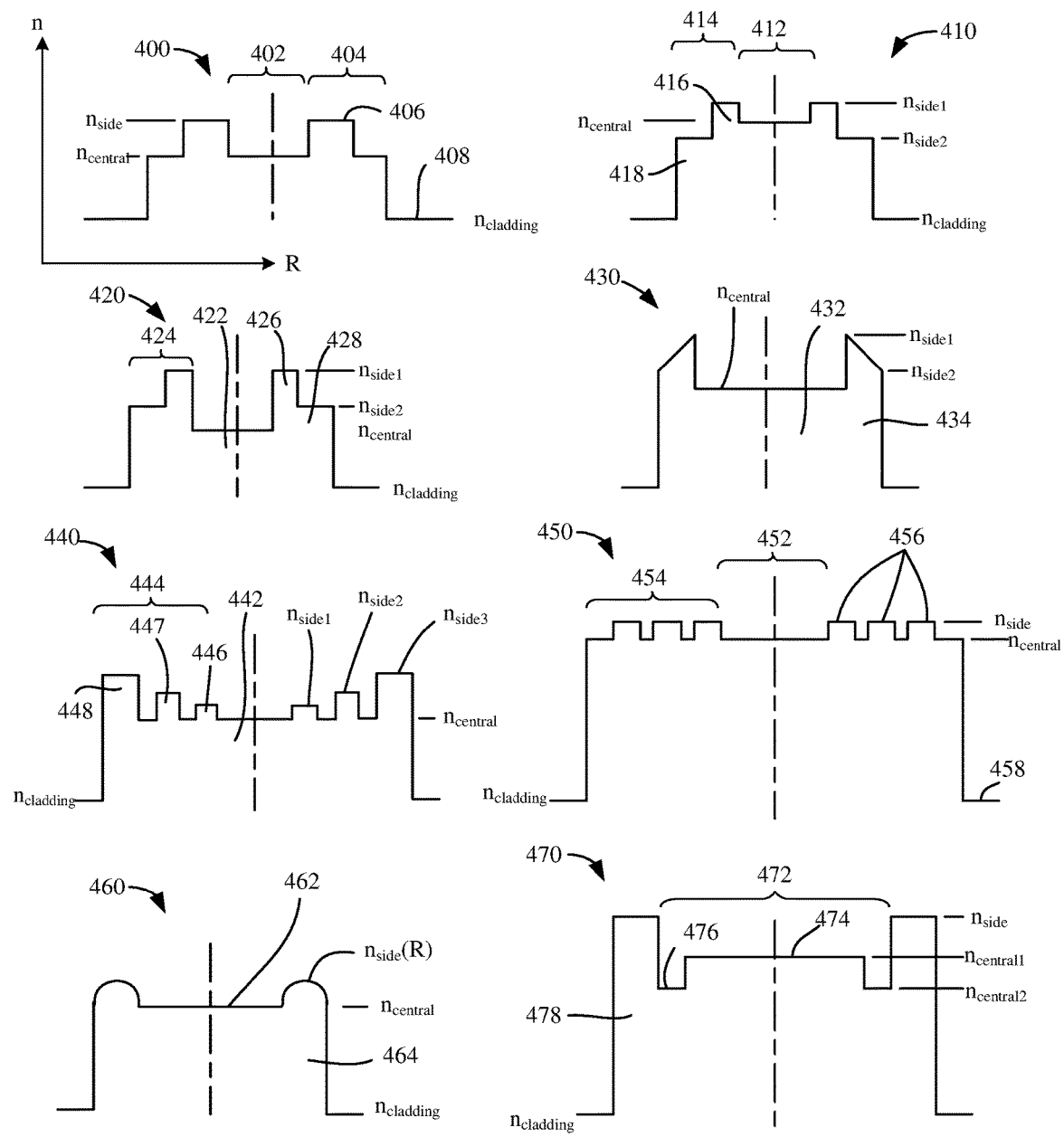
FIG. 4 shows eight representative refractive index profiles (i.e., refractive index as a function of radial coordinated) for representative fibers that can increase bpp. In these examples, the refractive index profiles are radially symmetric and, for convenient illustration, only portions of the refractive index profiles are labeled.

Referring to FIG. 4, several refractive index profiles (i.e., refractive index as a function of radial coordinate) are shown for transverse cross-sections of different bpp increasing fibers. Such refractive index profiles are generally symmetric about a center axis of the bpp increasing fiber, though it will be appreciated that asymmetric profiles may also be used. In a profile 400, a central core region 402 has a refractive index $n_{central}$ and an outer core region 404 includes a raised portion 406 having a refractive index $n_{side}$ that is larger than $n_{central}$. A cladding region 408 with a refractive index $n_{cladding}$ is situated radially adjacent to the central and outer core regions 402, 404. In typical examples, a difference in refractive index between $n_{central}$ of the central core region 402 and $n_{side}$ of the raised portion 406 is associated with a bpp increase for a multimode beam coupled through a bpp increasing fiber having a refractive index profile such as the refractive index profile 400. The refractive index $n_{central}$ can be lowered with the refractive index $n_{side}$ unchanged, $n_{side}$ can be raised with $n_{central}$ unchanged, and $n_{side}$ can be raised with $n_{central}$ also lowered.

In a profile 410, a central core region 412 has a refractive index $n_{central}$ and an outer core region 414 includes a raised portion 416 having a refractive index $n_{side1}$ that is larger than $n_{central}$. The outer core region 414 also includes an outer portion 418 having a refractive index $n_{side2}$ that is smaller than $n_{central}$. In a profile 420, a central core region 422 has a refractive index $n_{central}$ and an outer core region 424. The outer core region 424 includes a raised portion 426 with a refractive index $n_{side1}$ larger than $n_{central}$ and another raised portion 428 with a refractive index $n_{side2}$ that is smaller than $n_{side1}$ but larger than $n_{central}$.

In a profile 430, a central core region 432 has a refractive index $n_{central}$ and an outer core region 434 has a refractive index linearly variable from an inner refractive index $n_{side1}$ that decreases linearly to an outer refractive index $n_{side2}$ that is larger than $n_{central}$. In some examples, the inner refractive index $n_{side1}$ can increase linearly to an outer refractive index $n_{side2}$. In a further profile 440, a central core region 442 has a refractive index $n_{central}$ and an outer core region 444 that includes radially spaced and successively raised portions 446, 447, 448 each with a corresponding refractive index $n_{side1}$, $n_{side2}$, $n_{side3}$. In a profile 450, a central core region 452 has a refractive index $n_{central}$ and an outer core region 454 includes a plurality of raised portions 456 each having a refractive index $n_{side}$. The raised portions 456 can be equally spaced apart or variably spaced, and the outer-most portion of the raised portions 456 can coincide with the side boundary of the outer core region 454 with a cladding 458.

In a profile 460, a central core region 462 has a refractive index $n_{central}$ and an outer core region 464 has a variable refractive index $n_{side}(R)$ that has a circular shape or other continuous or discontinuous refractive index variation. The variable refractive index $n_{side}$ can also have shapes other than circular, such as elliptical, sinusoidal, monotonic, non-monotonic, etc. The refractive index $n_{central}$ of the central core region 462 may also be variable. In a profile 470, a central core region 472 includes a central raised portion 474 with a refractive index $n_{central1}$ and an adjacent lowered portion 476 with a refractive index $n_{central2}$ that is lower than $n_{central1}$. An outer core region 478 has a refractive index $n_{side}$ that is larger than $n_{central1}$ and $n_{central2}$. It will be appreciated that various refractive index shapes and profile features of the profiles of FIG. 4 can be combined to form other profiles.

Figure 5A:
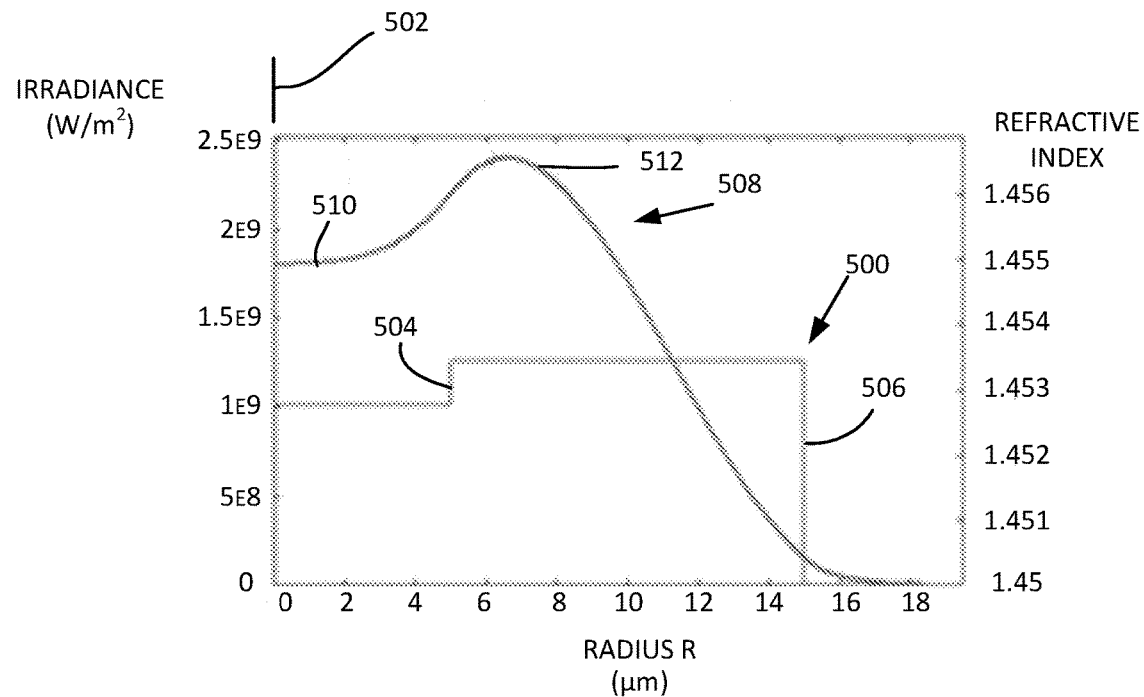
FIG. 5A is a graph of a representative beam intensity profile and an associated refractive index profile.
Figure 5B:
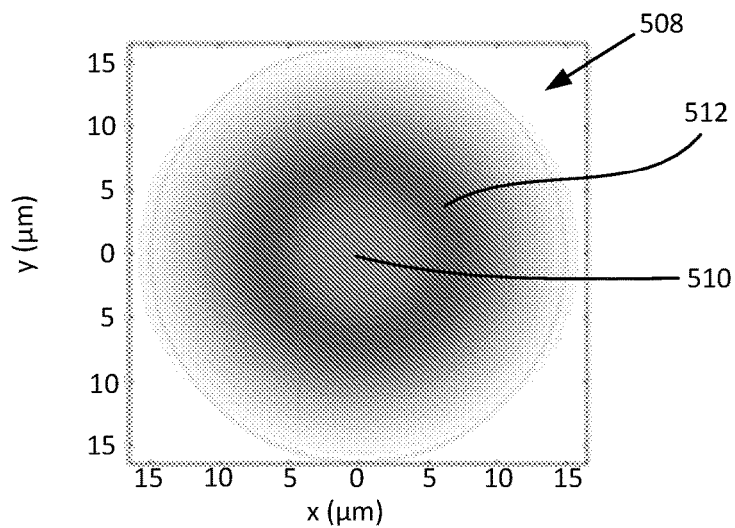
FIG. 5B is a cross-sectional plot corresponding to the beam intensity profile of FIG. 5A.

Referring to FIG. 5A, a chart depicts a portion of a refractive index profile 500 extending from a central optical axis 502 of an optical fiber where a refractive index of an optical fiber core is about 1.4530. At about 5 µm from the central optical axis 502, the refractive index of the core has a step increase 504 to about 1.4535 that extends to a core boundary 506 at about 14.5 µm from the central optical axis 502. A portion of a near-field transverse intensity beam profile 508 at or near the core is overlaid on the refractive index profile 500. The transverse intensity beam profile 508 includes a center portion 510 with a lower intensity than an adjacent side portion 512. The side portion 512 decreases rapidly to zero intensity in an evanescent tail outside the core boundary 506. FIG. 5B shows the near-field transverse intensity beam profile 508 corresponding to FIG. 5A.

In view of the many possible embodiments to which the principles of the disclosed technology may be applied, it should be recognized that the illustrated embodiments are only preferred examples of the disclosed technology and should not be taken as limiting in scope. For example, a bpp increasing fiber can be used with or without other fibers, and optical waveguides other than optical fibers can be similarly configured to increase bpp. Rather, the scope of the disclosed technology is defined by the following claims. We therefore claim all that comes within the scope and spirit of these claims.

We claim:

1. A method, comprising:
   generating a multimode laser beam having an initial beam parameter product; and
   directing the multimode laser beam through an input end of a beam parameter product (bpp) increasing fiber that is spliced to an output end of a preceding fiber propagating the multimode beam with the initial beam parameter product, so as to produce an output beam at an output of the bpp increasing fiber with a final beam parameter product that is greater than the initial beam parameter product based on a selected refractive index profile of the bpp increasing fiber.

2. The method of claim 1, wherein the initial beam parameter product is increased to the final beam parameter product to within ±5% of a selected final beam parameter product value.

3. The method of claim 1, wherein a coupling loss of the multimode laser beam associated with the bpp increasing fiber is less than or equal to 1%.

4. The method of claim 3, wherein the coupling loss is less than or equal to 0.2%.

5. The method of claim 1, wherein the refractive index profile of the bpp increasing fiber includes a refractive index in a central region of a fiber core that is lower than a refractive index in an outer region of the fiber core.

6. The method of claim 1, wherein the near-field transverse intensity of the output beam is lower in a central region of the bpp increasing fiber associated with a fiber central refractive index than in an outer region of the bpp increasing fiber associated with a fiber outer refractive index.

7. The method of claim 1, wherein the bpp increasing fiber is a passive fiber.

8. The method of claim 1, further comprising directing the multimode laser beam with the final beam parameter product to an input of a delivery fiber situated to direct the output beam to a target.

9. An apparatus, comprising:
   a laser source situated to generate a laser beam and having an associated beam parameter product;
   an output fiber optically coupled to the laser source and having a refractive index defining an output fiber core diameter and situated to receive the laser beam from the laser source; and
   a beam parameter product (bpp) increasing fiber having a core diameter corresponding to the output fiber core diameter and optically spliced to the output fiber so as to receive the laser beam from the output fiber with the associated bpp and to increase the associated bpp to a selected value based on a refractive index profile of the bpp increasing fiber.

10. The apparatus of claim 9, further comprising a delivery fiber optically coupled to the bpp increasing fiber and situated to direct the laser beam with increased beam parameter product to a target.

11. The apparatus of claim 10, wherein a coupling loss associated with coupling the bpp increasing optical fiber, the output fiber, and the delivery fiber is less than or equal to 1%.

12. The apparatus of claim 9, wherein the bpp increasing fiber is a passive fiber.

13. The apparatus of claim 9, wherein the refractive index profile includes a central core region refractive index of the bpp increasing fiber that is less than an outer core region refractive index of the bpp increasing fiber.

14. The apparatus of claim 9, wherein the bpp increasing optical fiber is situated to provide an emitted laser beam having an annular transverse intensity profile.

15. A method, comprising:
measuring a base beam parameter product associated with a multimode laser beam generated from a laser source and emitted from an output fiber output end;
determining a beam parameter product increase for the multimode laser beam;
selecting a beam parameter product increasing optical fiber having an input end and an output end and having a refractive index profile associated with increasing a bpp of an input beam by a predetermined amount so that the multimode laser beam with the base beam parameter product coupled to the input end has an output beam parameter product at the output end of the beam parameter product increasing optical fiber corresponding to the determined beam parameter product increase; and
splicing the input end of the beam parameter product increasing optical fiber to the output end of the output fiber.

16. The method of claim 15, further comprising:
splicing the output end of the beam parameter product increasing optical fiber to an input end of a delivery optical fiber.

17. The method of claim 16, wherein a coupling loss for the multimode laser beam associated with splicing the input end of the beam parameter product increasing optical fiber to the output end of the output fiber and output end of the beam parameter product increasing optical fiber to the input end of the delivery fiber is less than or equal to 1%.

18. The method of claim 15, wherein the refractive index profile of the beam parameter product increasing optical fiber has a core central refractive index that is less than a core outer refractive index.

19. The method of claim 15, wherein the determined beam parameter product increase is between 1% and 200% of the base beam parameter product.

20. A multimode fiber, comprising:
a central core;
an outer core situated about the central core, wherein a refractive index associated with the outer core is greater than a refractive index of the central core; and
a cladding situated about the central core, the cladding having a refractive index that is less than the refractive index associated with the outer core and less than the refractive index associated with the central core;
wherein the central core, outer core, cladding, and respective refractive indexes are configured to increase a beam parameter product (bpp) of an output beam emitted from an output end of the multimode fiber relative to a bpp of an input beam received from an optical fiber spliced to an input end of the multimode fiber, and to produce a transverse intensity profile for the output beam with a central portion that is smaller relative to a side portion.

21. The multimode fiber of claim 20, wherein the central core defines a few mode core.

22. The multimode fiber of claim 20, wherein the outer core includes portions associated with at least a first refractive index and a second refractive index, wherein at least one of the first refractive index and the second refractive index is greater than the refractive index of the central core.

23. The multimode fiber of claim 20, wherein the outer core includes portions associated with at least a first refractive index and a second refractive index, wherein the first refractive index and the second refractive index are greater than the refractive index of the central core.

24. The multimode fiber of claim 23, wherein a difference between the refractive index of the central core and the refractive index of the outer core is selected to annularize the transverse intensity profile of the output beam to include an intensity decrease at an outer edge that corresponds to a 60% decrease in a beam intensity over 20% of a beam radius.

* * * * *